United States Patent
Schoening et al.

(10) Patent No.: US 8,099,184 B2
(45) Date of Patent: Jan. 17, 2012

(54) LOAD COMPENSATION FOR ROBOTIC APPLICATIONS

(75) Inventors: John Schoening, Fort Collins, CO (US); Lance F. Guymon, Fort Collins, CO (US)

(73) Assignee: Rimrock Automation, Inc., Fort Collins, CO (US)

( * ) Notice: Subject to any disclaimer, the term of this patent is extended or adjusted under 35 U.S.C. 154(b) by 471 days.

(21) Appl. No.: 12/422,756

(22) Filed: Apr. 13, 2009

(65) Prior Publication Data

US 2010/0262275 A1 Oct. 14, 2010

(51) Int. Cl.
*G06F 19/00* (2006.01)
*G05B 19/04* (2006.01)
*G05B 19/418* (2006.01)
*B23Q 3/18* (2006.01)
*B64F 5/00* (2006.01)

(52) U.S. Cl. ............ 700/114; 700/247; 901/42; 901/48; 269/58; 269/61; 414/589

(58) Field of Classification Search .................. 700/114, 700/213, 245, 13, 28, 192–195, 262, 247; 901/23, 28, 48, 14, 42; 219/124.34; 318/568.13; 269/58, 61; 414/589
See application file for complete search history.

(56) References Cited

U.S. PATENT DOCUMENTS

| | | | | |
|---|---|---|---|---|
| 2,348,062 A | * | 5/1944 | Faber | 269/61 |
| 2,729,883 A | * | 1/1956 | Hilkemeier | 269/61 |
| 3,239,209 A | * | 3/1966 | Kucka | 269/55 |
| 3,499,549 A | * | 3/1970 | Wagner | 414/738 |
| 3,575,301 A | * | 4/1971 | Panissidi | 901/16 |
| 3,595,558 A | * | 7/1971 | Fisher et al. | 269/61 |

(Continued)

FOREIGN PATENT DOCUMENTS

EP 1731259 A1 * 12/2006

(Continued)

OTHER PUBLICATIONS

Weld Plus Inc., "Weld Plus Product Details—RP309001P Koike-Aronson Robotic Welding Positioner", obtained online at www.weldplus.com/product_details on Aug. 22, 2011.*

(Continued)

*Primary Examiner* — Kakali Chaki
*Assistant Examiner* — Kelvin Booker
(74) *Attorney, Agent, or Firm* — Christopher P. Whitham; Cochran Freund & Young LLC

(57) ABSTRACT

Disclosed is a method and system for compensating for the load a part places on a part positioner system that positions the part for work operations by a robot. The part positioner system rotates a part holding assembly about the axis of rotation of a shoulder drive. The part holding assembly may have a column that extends perpendicular to the shoulder center line. A counter weight system is incorporated into the column that includes a counter weight pack that is moved along the length of the column. The shoulder drive drives the part and part holding assembly load in order to measure a torque applied to the shoulder drive. A load offset may be calculated based on the applied torque. The counter weight pack may then be moved to a position on the column calculated to balance the load of the part and part holding assembly. Alternatively, the counter weight may be moved empirically in a feedback loop in response to repeated torque measurements of the shoulder drive until an optimum torque is achieved at the shoulder drive.

65 Claims, 11 Drawing Sheets

U.S. PATENT DOCUMENTS

| | | | |
|---|---|---|---|
| 3,878,951 A * | 4/1975 | Wagner | 414/680 |
| 4,455,838 A * | 6/1984 | Junichi et al. | 60/711 |
| 4,517,853 A * | 5/1985 | Tani et al. | 74/89.32 |
| 4,527,942 A * | 7/1985 | Smith | 901/14 |
| 4,541,062 A * | 9/1985 | Kada et al. | 700/247 |
| 4,641,820 A * | 2/1987 | Gold et al. | 269/58 |
| 4,713,873 A * | 12/1987 | Gold et al. | 29/559 |
| 4,890,579 A * | 1/1990 | Oloff et al. | 119/722 |
| 4,892,993 A * | 1/1990 | Stol | 901/42 |
| 5,313,695 A * | 5/1994 | Negre et al. | 901/42 |
| 5,325,305 A * | 6/1994 | Rezaei | 700/114 |
| 5,873,569 A * | 2/1999 | Boyd et al. | 269/43 |
| 6,053,280 A * | 4/2000 | Smith et al. | 182/82 |
| 6,281,474 B1 * | 8/2001 | Michael et al. | 219/158 |
| 6,305,678 B1 * | 10/2001 | Hammersmith et al. | 269/71 |
| 6,347,733 B1 * | 2/2002 | Hickey, II | 269/71 |
| 6,606,531 B1 * | 8/2003 | Leibinger et al. | 700/114 |
| 7,172,376 B1 * | 2/2007 | Jagtap et al. | 409/225 |
| 7,300,240 B2 * | 11/2007 | Brogardh | 901/15 |
| 2003/0141155 A1 * | 7/2003 | Daneryd et al. | 188/267.1 |
| 2005/0129495 A1 * | 6/2005 | Brogardh | 414/680 |
| 2006/0278622 A1 * | 12/2006 | Inoue et al. | 219/125.1 |
| 2008/0246204 A1 * | 10/2008 | Wilkinson et al. | 269/61 |
| 2011/0084052 A1 * | 4/2011 | Larkins | 219/136 |
| 2011/0174793 A1 * | 7/2011 | Shiraga et al. | 219/136 |
| 2011/0186615 A1 * | 8/2011 | Gatlin et al. | 228/102 |

FOREIGN PATENT DOCUMENTS

| | | | |
|---|---|---|---|
| JP | 57032896 A * | 2/1982 | |
| JP | 61020667 A * | 1/1986 | |
| JP | 63154296 A * | 6/1988 | |
| JP | 64053777 A * | 3/1989 | |
| JP | 01101279 A * | 4/1989 | |
| JP | 03005097 A * | 1/1991 | |
| JP | 05112901 A * | 5/1993 | |
| JP | 05177391 A * | 7/1993 | |
| JP | 05228632 A * | 9/1993 | |
| JP | 05318109 A * | 12/1993 | |
| JP | 05318120 A * | 12/1993 | |
| JP | 06170531 A * | 6/1994 | |
| JP | 06344142 A * | 12/1994 | |
| JP | 07164188 A * | 6/1995 | |
| JP | 07310436 A * | 11/1995 | |
| JP | 08025088 A * | 1/1996 | |
| JP | 2000254778 A * | 9/2000 | |
| JP | 2000263291 A * | 9/2000 | |
| JP | 2000288787 A * | 10/2000 | |

OTHER PUBLICATIONS

Wolf Robotics, "System Profie", 2007, Form No. 1081-20, obtained online at www.wolfrobotics.com on Aug. 22, 2011.*

Wolf Robotics, "SmartPositioners—Manual and Automated Arc Welding Positioners", 2007, Form No. 1248-2b, obtained online at www.wolfrobotics.com on Aug. 22, 2011.*

* cited by examiner

_US 8,099,184 B2_

LOAD COMPENSATION FOR ROBOTIC APPLICATIONS

BACKGROUND OF THE INVENTION

For large, industrial robotic applications it is often necessary to manipulate a part that is the target of a robot so that the robot may access the part from different sides and at different angles. For instance, in many welding applications it is often desirable to place the part in front of the robot at a specific angle so that the weld applied by the robot occurs with a specific relation to gravity since the effect of gravity on the molten metal may play a key role in the end quality of the weld. When welding along a curved line, it may further be desirable to rotate the part to maintain the weld/part angle with respect to gravity and the robot welder. For various industrial robotic applications, the target part may be very large and/or unwieldy. Thus, the part positioner to position the target part for work operations by the robot may need to be very large to accommodate the target part.

SUMMARY OF THE INVENTION

An embodiment of the present invention may comprise a method to compensate for a combined load offset on a part positioner system that positions a part to be worked on by a robot comprising: providing the part positioner system that has a shoulder with a rotational shoulder drive that rotates a part holding assembly around a shoulder center line, the shoulder center line being a line along an axis of rotation of the rotational shoulder drive, the part holding assembly comprising a column having a column length disposed substantially perpendicular to the shoulder center line; providing a counter weight system for the column that has a counter weight pack that is moveable back and forth along at least a portion of the column length of the column by a linear actuator; loading the part to be worked on by the robot onto the part holding assembly to create a combined load of the part holding assembly and the part; driving the combined load using the rotational shoulder drive; measuring a test torque on the rotational shoulder drive during the driving of the combined load as a function of angular position of the rotational shoulder drive and power supplied to the rotational shoulder drive; calculating an updated position for the counter weight pack that substantially balances the combined load with respect to the shoulder center line as a function of the test torque; adjusting the counter weight pack by the linear actuator along the portion of the column length to the updated position; and, operating the part positioner system with a balanced combined total load to position the part to accommodate work operations of the robot.

An embodiment of the present invention may further comprise a method to compensate for a combined load offset on a part positioner system that positions a part to be worked on by a robot comprising: loading the part onto a part holding assembly of the part positioner system to create a combined load, the part positioner system having a rotational drive that rotates the combined load around a rotational drive axis of rotation and at least one column having at least one counter weight pack that extends substantially perpendicular to the rotational drive axis of rotation; holding the combined load using the rotational shoulder drive at an angular position such that the angular position of the combined load provides a substantive weight for the shoulder drive to resist when holding the combined load at the angular position; moving the at least one counter weight pack linearly along a length of the at least one column in a predetermined direction at a predetermined speed; measuring a torque applied to the shoulder drive as a function of power delivered to the shoulder drive while moving the at least one counter weight pack; reversing direction of the movement of the at least one counter weight pack if the measured torque is increasing; stopping the movement of the at least one counter weight pack at a balanced location on the column when the torque reaches a minimum torque value; and, operating the part positioner system with a balanced combined total load to position the part to accommodate work operations of the robot.

An embodiment of the present invention may further comprise a method to compensate for a combined load offset on a part positioner system that positions a part to be worked on by a robot comprising: providing the part positioner system that has a shoulder with a rotational shoulder drive that rotates a part holding assembly around a shoulder center line, the shoulder center line being a line along an axis of rotation of the rotational shoulder drive, the part holding assembly comprising a column disposed perpendicular to the shoulder center line; providing a counter weight system for the column that has a counter weight pack that is moveable back and forth along at least a portion of the column length of the column by a linear actuator; loading the part to be worked on by the robot onto the part holding assembly to create a combined load of the part holding assembly and the part; determining a counter weight balance movement direction that indicates a direction to move the counter weight pack along the portion of the column length to reduce a torque applied by the rotational shoulder drive to rotate the combined load; measuring a base torque on the rotational shoulder drive by performing a torque measurement sub-process, the torque measurement sub-process further comprising: driving the combined load using the rotational shoulder drive; and, measuring a torque on the shoulder drive as a function of angular position of the rotational shoulder drive and power supplied to the rotational shoulder drive; performing a counter weight adjustment sub-process, the counter weight adjustment sub-process further comprising: moving the counter weight pack by the linear actuator the predetermined distance in the counter weight balance movement direction along the portion of the column length; measuring a test torque on the rotational shoulder drive by performing the torque measurement sub-process; comparing the base torque to the test torque; and, setting the base torque equal to the test torque and repeating the counter weight adjustment sub-process if the test torque is less than the base torque; and, operating the part positioner system with a balanced combined total load to position the part to accommodate work operations of the robot.

An embodiment of the present invention may further comprise a load compensation system that compensates for a combined load offset on a part positioner system that positions a part to be worked on by a robot comprising: the part positioner system having a shoulder with a rotational shoulder drive that rotates a part holding assembly around a shoulder center line, the shoulder center line being a line along an axis of rotation of the rotational shoulder drive, the part holding assembly comprising a column having a column length disposed perpendicular to the shoulder center line; a counter weight system for the column that has a counter weight pack that is moveable back and forth along at least a portion of the column length of the column by a linear actuator; the part to be worked on by the robot being loaded onto the part positioner by being attached to the part holding assembly to create a combined load of the part holding assembly and the part; and, a torque measurement subsystem that drives the combined load using the rotational shoulder drive and measures torque on the rotational shoulder drive during the driving of the combined load as a function of angular position of the rotational shoulder drive and power supplied to the rotational shoulder drive; a counter weight adjustment subsystem that measures a test torque on the rotational shoulder drive using the torque measurement subsystem calculates an updated position for the counter weight pack that substantially balances the combined load with respect to the shoulder center line as a function of the test torque, and adjusts the counter weight pack by the linear actuator along the portion of the column length to the updated position.

An embodiment of the present invention may further comprise a load compensation system that compensates for a combined load offset on a part positioner system that positions a part to be worked on by a robot comprising: the part positioner system having a part holding assembly with the part loaded on the part holding assembly to create a combined load, the part positioner system having a rotational drive that rotates the combined load around a rotational drive axis of rotation and at least one column having at least one counter weight pack that extends substantially perpendicular to the rotational drive axis of rotation; and, a load balancing subsystem that holds the combined load using the rotational shoulder drive at an angular position such that the angular position of the combined load provides a substantive weight for the shoulder drive to resist when holding the combined load at the angular position, moves the at least one counter weight pack linearly along a length of the at least one column in a predetermined direction at a predetermined speed, measures a torque applied to the shoulder drive as a function of power delivered to the shoulder drive while moving the at least one counter weight pack, reverses direction of the movement of the at least one counter weight pack if the measured torque is increasing, and stops the movement of the at least one counter weight pack at a balanced location on the column when the torque reaches a minimum torque value.

An embodiment of the present invention may further comprise a load compensation system that compensates for a combined load offset on a part positioner system that positions a part to be worked on by a robot comprising: the part positioner system having a shoulder with a rotational shoulder drive that rotates a part holding assembly around a shoulder center line, the shoulder center line being a line along an axis of rotation of the rotational shoulder drive, the part holding assembly comprising a column having a column length disposed perpendicular to the shoulder center line; a counter weight system for the column that has a counter weight pack that is moveable back and forth along at least a portion of the column length of the column by a linear actuator; the part to be worked on by the robot being loaded onto the part positioner by being attached to the part holding assembly to create a combined load of the part holding assembly and the part; and, a movement direction determination subsystem that determines a counter weight balance movement direction that indicates a direction to move the counter weight pack along the portion of the column length to reduce a torque applied by the rotational shoulder drive to rotate the combined load; a torque measurement subsystem that drives the combined load using the rotational shoulder drive and measures torque on the rotational shoulder drive during the driving of the combined load as a function of angular position of the rotational shoulder drive and power supplied to the rotational shoulder drive; a base torque measurement subsystem that measures a base torque using the torque measurement subsystem; and, a counter weight adjustment subsystem that performs a counter weight adjustment process that moves the counter weight pack by the linear actuator the predetermined distance in the counter weight balance movement direction along the portion of the column length, measures the test torque on the rotational shoulder drive using the torque measurement subsystem; compares the base torque to the test torque, and, sets the base torque equal to the test torque and repeats the counter weight adjustment process if the test torque is less than the base torque.

An embodiment of the present invention may further comprise a load compensation system that compensates for a combined load offset on a part positioner system that positions a part to be worked on by a robot comprising: means for providing the part positioner system that has a shoulder with a rotational shoulder drive that rotates a part holding assembly around a shoulder center line, the shoulder center line being a line along an axis of rotation of the rotational shoulder drive, the part holding assembly comprising a column having a column length disposed perpendicular to the shoulder center line; means for providing a counter weight system for the column that has a counter weight pack that is moveable back and forth along at least a portion of the column length of the column by a linear actuator; means for loading the part to be worked on by the robot onto the part positioner to create a combined load of the part holding assembly and the part; means for driving the combined load using the rotational shoulder drive; means for measuring a test torque on the rotational shoulder drive during the driving of the combined load; means for calculating an updated position for the counter weight pack that substantially balances the combined load with respect to the shoulder center line as a function of the test torque; means for adjusting the counter weight pack by the linear actuator along the portion of the column length to the updated position; and, means for operating the part positioner system with a balanced combined total load to position the part to accommodate work operations of the robot.

An embodiment of the present invention may further comprise a load compensation system that compensates for a combined load offset on a part positioner system that positions a part to be worked on by a robot comprising: means for loading the part onto a part holding assembly of the part positioner system to create a combined load, the part positioner system having a rotational drive that rotates the combined load around a rotational drive axis of rotation and at least one column having at least one counter weight pack that extends substantially perpendicular to the rotational drive axis of rotation; means for holding the combined load using the rotational shoulder drive at an angular position such that the angular position of the combined load provides a substantive weight for the shoulder drive to resist when holding the combined load at the angular position; means for moving the at least one counter weight pack linearly along a length of the at least one column in a predetermined direction at a predetermined speed; means for measuring a torque applied to the shoulder drive as a function of power delivered to the shoulder drive while moving the at least one counter weight pack; means for reversing direction of the movement of the at least one counter weight pack if the measured torque is increasing; means for stopping the movement of the at least one counter weight pack at a balanced location on the column when the torque reaches a minimum torque value; and, means for operating the part positioner system with a balanced combined total load to position the part to accommodate work operations of the robot.

An embodiment of the present invention may further comprise a load compensation system that compensates for a combined load offset on a part positioner system that positions a part to be worked on by a robot comprising: means for providing the part positioner system that has a shoulder with a rotational shoulder drive that rotates a part holding assembly around a shoulder center line, the shoulder center line being a line along an axis of rotation of the rotational shoulder drive, the part holding assembly comprising a column disposed perpendicular to the shoulder center line; means for providing a counter weight system for the column that has a counter weight pack that is moveable back and forth along at least a portion of the column length of the column by a linear actuator; means for loading the part to be worked on by the robot onto the part positioner to create a combined load of the part holding assembly and the part; means for determining a counter weight balance movement direction that indicates a direction to move the counter weight pack along the portion of the column length to reduce a torque applied by the rotational shoulder drive to rotate the combined load; means for measuring a base torque on the rotational shoulder drive by performing a torque measurement sub-process, the torque measurement sub-process further comprising: means for driving the combined load using the rotational shoulder drive; and, means for measuring a torque on the shoulder drive; means for performing a counter weight adjustment sub-process, the counter weight adjustment sub-process further comprising: means for moving the counter weight pack by the linear actuator the predetermined distance in the counter weight balance movement direction along the portion of the column length; means for measuring a test torque on the rotational shoulder drive by performing the torque measurement sub-process; means for comparing the base torque to the test torque; and, means for setting the base torque equal to the test torque and repeating the counter weight adjustment sub-process if the test torque is less than the base torque; and, means for operating the part positioner system with a balanced combined total load to position the part to accommodate work operations of the robot.

DETAILED DESCRIPTION OF THE EMBODIMENTS

Figure 1:
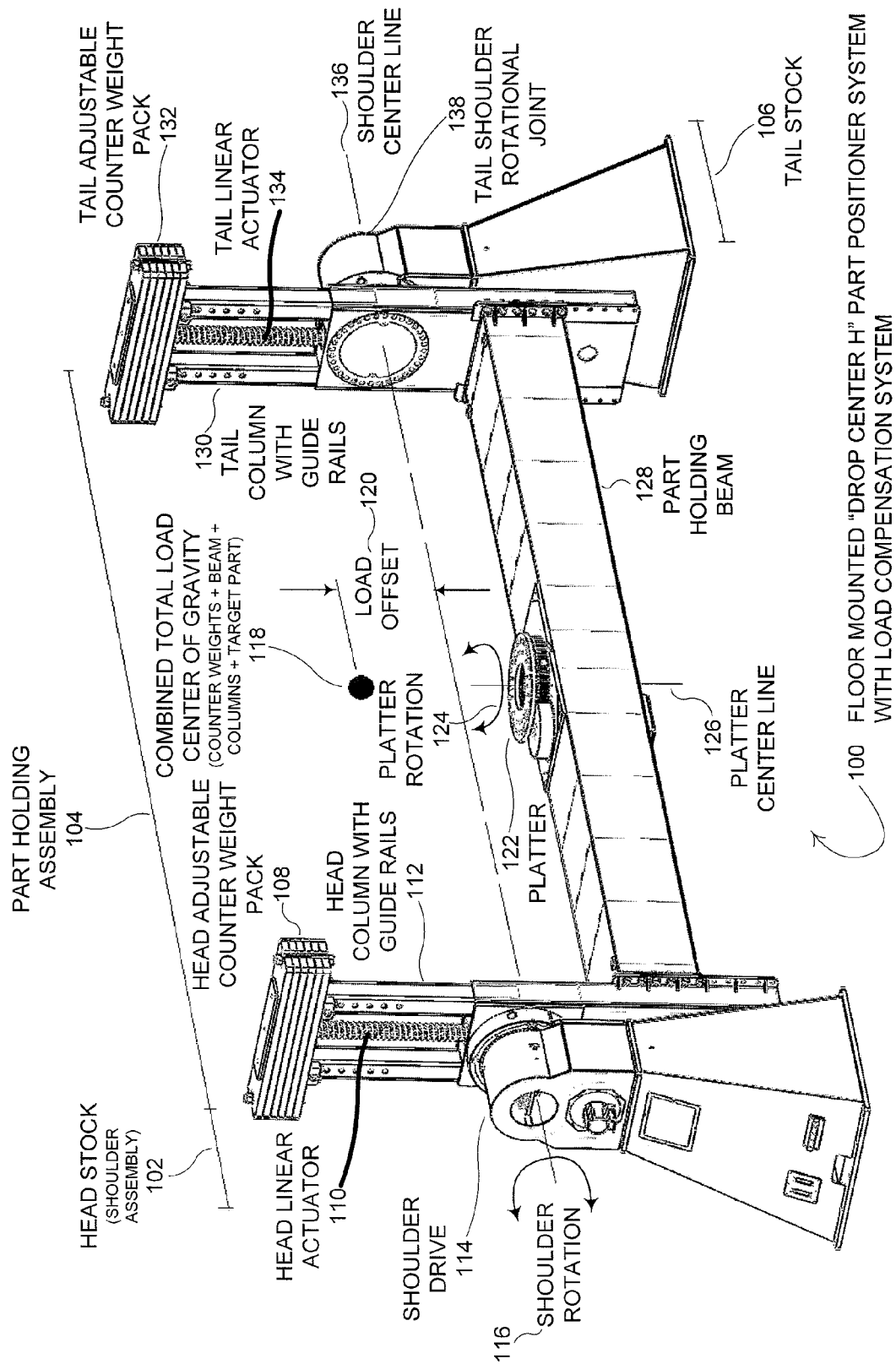
FIG. 1 is a three-dimensional diagram of a floor mounted "Drop Center H" part positioner system with a load compensation system.

Typically, a part positioner includes at least one rotational axis that a part is turned around. Two types of part positioners include a "Drop Center H" positioner and a "SkyHook" positioner. A Drop Center H positioner has a part holding assembly that is rotated around a shoulder center line by a shoulder drive. The Drop Center H part positioner includes a beam that holds the target part that is dropped away from, and is parallel to, the shoulder center line. Each end of the beam is attached to a column that is perpendicular to the shoulder center line. The beam runs between an end with a rotational shoulder drive (i.e., the head stock) and another supporting end with a rotational connection to permit rotation around the shoulder center line (i.e., the tail stock). When mounted on the floor, the system has an appearance much like the letter "H." Often, the point on the beam where a part is connected is a motorized platter that permits the part to be rotated around the center line of the platter. The center line of the platter is perpendicular to the center line of the shoulder drive, thus, giving full rotation of the target part within two separate dimensions. Since the part holding beam of the Drop Center H positioner is supported on both ends, the Drop Center H is an ideal positioner for very heavy target parts.

The SkyHook positioner is similar to the Drop Center H positioner, but the supporting tail stock is removed. In other words, half of the "H" of the Drop Center H positioner is removed and the part holding beam is free floating. The SkyHook positioner allows greater flexibility for the robot to access the target part since the part holding beam is only supported on one end by a column attaching the part holding beam to the rotational shoulder drive. While the SkyHook positioner may not support as much target part load as a Drop Center H positioner, a SkyHook positioner may be designed with enough strength to carry very significant loads if so desired. For a SkyHook positioner, a tail stock may be added to the platter rotational axis so that the target part is held in place between two parallel part holding beams. The two part holding beams are connected by the column, which also connects to the rotational shoulder drive such that the two parallel part holding beams and the column rotate about the shoulder center line (aka. shoulder rotational axis).

The part holding beam(s), column(s), and the target part may create significant forces as a combined part holding assembly that is rotated about the shoulder center line. To reduce the damaging affect of the forces on the connection to and operation of the rotational shoulder drive, a counter weight is typically included on the opposite side of the shoulder center line from the center of gravity of the combined part holding assembly. The combined part holding assembly may be assumed to include the target part loaded on to the part holding assembly. The counter weight is typically placed on the column(s) that connects the part holding beam(s) to the rotational shoulder drive and/or rotational joint on the Drop Center H tail stock. Typically the column is allowed to extend beyond the shoulder drive on the side opposite the part holding beam. To maintain the same working envelope, it is typically desirable that the column not extend any further on the opposite side from the beam as the length of the column necessary to connect to the part holding beam. Thus, to create the proper balance, a stack of heavy weights (i.e., a counter weight pack) may be placed on the column at a location designed to adjust the overall center of gravity of the counter weights, column(s), beam(s), and the target part to be as close as possible to the shoulder center line as possible in order to reduce the force necessary to rotate the combined part holding assembly. For large target parts, the counter weights may be very large. Typically, a counter weight set up (i.e., the amount of weight and the location on the column for the counter weight) is individually determined for a target part and the part positioner that is set up to position the individual target part. The counter weights are manually placed on the column and then bolted in the proper place for the target part being positioned by the part positioner. While some columns have multiple holes for bolting in counter weight pack(s), changing the amount and location of counter weight pack(s) is a difficult and labor intensive task that may take several hours or more to perform. Further, the changes for a new part may require that the entire part holding assembly with the part be re-analyzed in order to determine the combined center of gravity so a new desired location for the counter weight pack may be calculated. If a part changes weight during the robot work operations (i.e., the weight added by additional metal included in multiple welding operations), the overall part positioner system, particularly the shoulder drive, will need to be sized to handle the extra torque from a sub-optimal combined center of gravity of the part holding assembly.

FIG. 1 is a three-dimensional diagram of a floor mounted "Drop Center H" part positioner system 100 with a load compensation system. The Drop Center H part positioner 100 may be comprised of a head stock portion 102, a part holding assembly portion 104, and a tail stock portion 106. The head stock portion 102, which may also be referred to as the shoulder assembly 102, contains the shoulder drive 114 that rotates 116 the part holding assembly 104 around the shoulder center line 136 in order to position a part attached to the part holding assembly 104 to be worked on by a robot. The robot may be mounted external to the part positioner 100. The part holding assembly 104 includes the part holding beam 128, head column 112, tail column 130 and any counter weights 108, 132 or other equipment 110, 122, 134 incorporated into the columns 112, 130 or beam 128 of the part holding assembly 104. The tail stock 106 typically provides support for the tail end of the part holding beam by providing a tail column 130 connected to the tail stock 106 through a tail shoulder rotational joint 138 that permits the entire part holding assembly to be rotated 116 around the shoulder center line 136. The part holding beam 128 is connected to the head stock 102 shoulder drive 114 and the tail stock 106 shoulder rotational joint 138 via a head stock column 112 and a tail stock column 130, respectively. The part holding beam 128 extends parallel to the shoulder center line 136 of the shoulder drive 114. The head 112 and tail 130 columns extend perpendicularly from the part holding beam 128 passing through the shoulder center line. The head 112 and tail 130 columns connect the beam 128 to the head stock 102 shoulder drive 114 and the tail stock 106 rotational shoulder joint 138.

Typically a target part is loaded onto the part holding assembly 104 at the platter 122 of the part holding beam 128. Often, the platter 122 has a drive that permits the target part to be rotated 124 around the center line 126 of the platter 122. The platter center line 126 typically extends perpendicularly to the shoulder center line 136. Thus, a target part may be rotated three hundred and sixty degrees on two perpendicular axes 126, 136 to permit greater flexibility in placing the target part for work operations of the robot operating on the part. After loading a target part, the combined total load of the target part and the part holding assembly 104 has a center of gravity 118. Without some adjustment of counter weights 108, 132, it is unlikely that the combined total load center of gravity 118 is aligned with the shoulder center line 136. Typically, the part holding assembly and target part are analyzed to calculate the load offset 120 indicating the distance from the shoulder center line 136 to the combined total load center of gravity 118. Once the load offset is calculated based on the weights and geometries of the part holding assembly 104 and the loaded target part, the location on the columns 112, 130 where an appropriate counter weight 108, 132 may be bolted to each column 112, 130 to shift the combined total load center of gravity 118 closer to the shoulder center line 136 may also be calculated. After an appropriate location and size of counter weights 108, 132 is calculated, the appropriate counter weights 108, 132 may be loaded and properly located on the columns 112, 130. The process of calculating the combined load center of gravity 118, load offset 120, and counter weight pack 108, 132 size/placement may take a significant amount of time to model the part/positioner system and to properly load and locate the counter weight packs 108, 132. Further, the actual center of gravity for a combined load for a target part may vary by a non-negligible amount between different instances of the same part. Thus, it may be necessary to significantly over size the rotational shoulder drive and gearing for a part positioner to ensure the part positioner will work consistently.

An embodiment may provide a load compensation system that permits the counter weights 108, 132 to be adjusted for a loaded target part based on the torque applied to the shoulder drive 114 when the shoulder drive 114 drives/rotates 116 the combined total load (including the target part). The torque applied to the shoulder drive 114 when driving/rotating 116 the combined total load may be measured as a function of the power applied to the shoulder drive 114 to either drive the shoulder drive to hold the combined total load against gravity or as a function of the power applied to the shoulder drive 114 to rotate the combined total load through at least a portion of an arc at an angular speed. Power delivered to the shoulder drive may be said to be proportional to the torque applied to the drive. Thus, an embodiment may obtain a torque measurement by virtue of the torque to power relationship for a particular shoulder drive. For a system that measures torque as a function of the angular speed in a rotation of the combined load, a torque measurement may be derived from the power delivered to the shoulder drive and the angular speed. For a real-world system, some power loss may need to be attributed to shoulder drive inefficiencies (e.g., friction, electrical resistance loss, etc.) To obtain angular speed the change a measurement of a change in angular position may be necessary. The change in angular position of the shoulder drive 114 may be obtained from an output from the shoulder drive 114, or the change in angular position may be determined as the change in angular position requested by the load compensation system. The angular speed may then be determined by measuring the time required to rotate the combined load through the change in angular position. The power delivered to the shoulder drive 114 may be obtained as an output from the shoulder drive 114. Since most commonly used electrical devices are provided power from a system with a fixed voltage such that the electrical current varies with motor load, the power delivered to the shoulder drive 114 may be assumed to be directly dependent on (i.e., proportional to) the electrical current delivered to the shoulder drive 114. Thus, for a fixed voltage system, the torque may be calculated based on the electrical current supplied to the shoulder drive 114 and the change in angular position of the shoulder drive 114 resulting from the supplied electrical current. In some embodiments, the torque may be calculated directly by the shoulder drive 114 control systems and delivered as an output of the shoulder drive. In some cases it may be desirable to perform a basic geometric analysis of the system to determine a starting location for the counter weight packs 108, 132 in order to avoid excessive strain on the shoulder drive 114 if the counter weight packs 108, 132 are significantly out of balance.

Both the head column 112 and tail column 130 of the Drop Center H positioner 100 have a linear actuator 110, 134 that adjusts the position of the counter weight packs 108, 132 along the length of each column 112, 130. The counter weight packs 108, 132 are attached to the column using rails and may slide back and forth along the length of the column 112, 130 in response to the linear actuators 110, 134. The counter weight packs 108, 132 may be designed to slide easily along the rails using rollers, ball rails, slide and lubrication, or other means substantially designed to permit the counter weight packs 108, 132 to be moved back and fourth along the length of the columns 112, 130. For a Drop Center H positioner 100, there is typically a head counter weight pack 108 for the head column 112 and a tail counter weight pack 132 for the tail column 130. For simplicity, the location in distance from the shoulder center line 136 on the columns 112, 130 is typically assumed to be equal for both the head 108 and tail 132 counter weight packs. Some embodiments may include only a head 108 or a tail 132 weight pack. Having a counter weight pack on only the head 112 or tail column 130 of a Drop Center H positioner 100 may encounter other balance and structural problems, but the single counter weight pack may still appropriately shift the center of gravity for the rotation around the shoulder center line 136. Other embodiments may not place the head 108 and tail 132 counter weight packs equidistant from the shoulder center line 136 on the columns 112, 130. Again, the Drop Center H positioner 100 may encounter other balance and structural problems due to the non-equidistant placement of the counter weight packs 108, 132, but it is still possible, even if more difficult, to calculate the effect on the combined load center of gravity 118 with relation to the shoulder center line 136. Various embodiments may incorporate the structural function of the guide rails into the linear actuators 110, 134. In a situation where there are no guide rails, the structure of the linear actuators 110, 134 may need to be significantly enhanced in order to hold what may be a very large amount of weight (i.e., potentially multiple tons may be necessary for very large target parts).

Once a torque is obtained for the combined load of the part holding assembly 104 and the target part, the load compensation system may a new position for the counter weight packs 108, 132 on the columns 112, 130. The torque calculations follow normal torque characteristics and may be performed by a person skilled in the art. As is true for most electro-mechanical systems, there are many potential calculation methodologies that may be used to obtain the same end result of a new position for the counter weight packs 108, 132 on the columns 112, 130 to improve the combined load balance with respect to the shoulder center line 136. For instance, an embodiment may calculate the new position for the counter weight packs 108, 132 based on a known weight of the counter weight packs 108, 132, a known weight of the part and part holding assembly 104 excluding the counter weight packs 108, 132 and a known distance of the counter weight packs 108, 132 from the shoulder center line 138 (see the disclosure with respect to FIG. 2 for a more detailed description of a torque calculation methodology for an embodiment). Another embodiment may may calculate the load offset 120 for the combined load and then calculate a new counter weight 108, 132 position based on the combined load offset 120. Still other embodiments may approach the calculation of a new position using other variations of the electro-mechanical properties of the system.

The linear actuators 110, 134 may be driven manually or by a motor. If the linear actuators 110, 134 are manually driven, the desired location for the counter weight packs 108, 132 may be communicated to a user and the user may then manually adjust the counter weight pack using the manual linear actuators 110, 134. Some possible methods of communicating to a user include displaying the adjustment value on a computer monitor, printing a sheet with the desired adjustments, audibly announcing the desired adjustments, or other known means of communicating information to a user. For a load compensation system with motorized linear actuators 110, 134, the counter weight packs 108, 132 may be automatically adjusted to the desired location on the columns 112, 130.

Various embodiments may alternatively employ a scheme to adjust the counter weight packs 108, 132 to an optimum location on the columns 112, 130 using a feedback system that repeatedly moves the counter weight packs 108, 132 in a counter weight balance movement direction and measures the torque necessary to rotate the combined part and part holding assembly with each adjustment of location of the counter weight packs 108, 132 in comparison to the torque measured for a prior location of the counter weight packs 108, 132. As discussed above, the torque may be proportional to the power delivered to the shoulder drive 114 and/or to the current delivered to the shoulder drive 114. Thus, for a feedback embodiment where a decision is based on a relative difference between two torque measurements, the proportional nature of the torque with the power and/or current may permit an embodiment to directly compare the power and/or current measurements as a substitute for an actual torque measurement since the torque is directly dependent on the power and/or current. If the adjusted torque is less than the prior torque, then the system may continue to move the counter weight packs 108, 132 in the same direction. If the adjusted torque is greater than the prior torque, the system may stop moving the counter weight packs 108, 132 since the adjusted counter weight location has passed over the theoretical optimum location for the counter weight packs 108, 132. In order to further refine the counter weight pack 108, 132 location, the distance moved between torque measurements may be reduced and the process repeated. The distance moved between torque measurements may continue to be reduced until an acceptable margin of error is achieved by the load compensation system in the balance of the combined load center of gravity 118 with reference to the shoulder center line 136.

Figure 2:
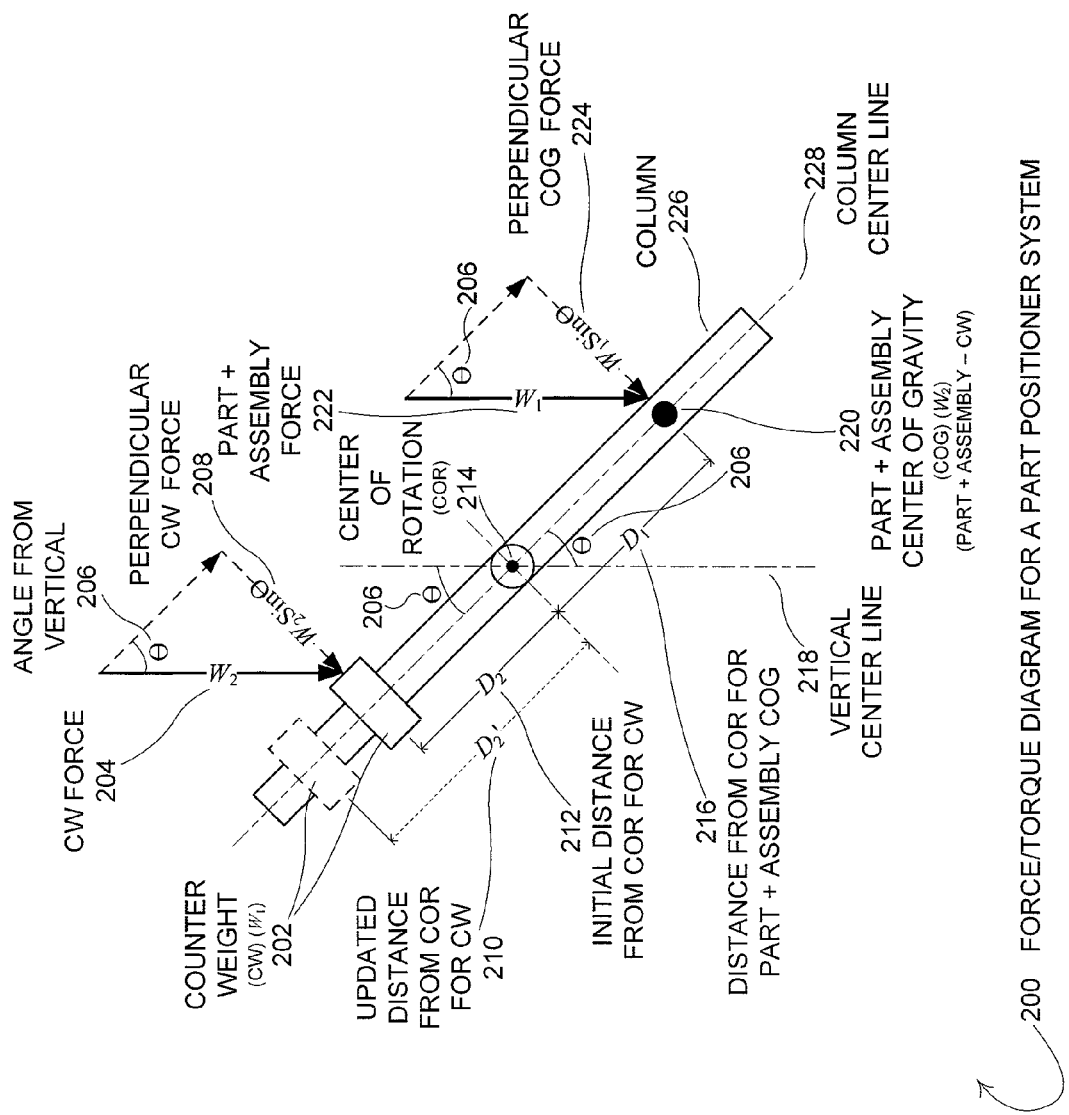
FIG. 2 is a force/torque diagram for a part positioner system.

FIG. 2 is a force/torque diagram 200 for a part positioner system. Torque ($\tau$) may be measured mechanically as the multiplication product of a force (F) applied perpendicular to a moment arm (i.e., the column 228) that rotates about a center of rotation 214 (i.e., shoulder center line) and the distance (r) from the center of rotation 214 to the location on the moment are 228 where the force is applied as in Eq. 1.

$$\tau = rF \qquad \text{Eq. 1}$$

Torque may also be measured in terms of the angular speed of rotation and the power applied to achieve the angular speed of rotation as in Eq. 2.

$$\tau = \frac{Power}{Angular\_Speed} \quad \text{Eq. 2}$$

To calculate an updated distance (i.e., position) ($D_2'$) 210 from the center of rotation (COR) 214 for the counter weight (CW) 202, an embodiment may obtain a torque measurement for the system and then calculate the updated distance ($D_2'$) 210 based on the torque calculation. For an embodiment that measures the torque based on the proportional relationship between power and/or current supplied to the shoulder drive to hold the part holding assembly plus the part in place against the gravitational forces 204, 222 applied by the part holding assembly plus the part, the perpendicular weight forces 208, 224 will remain constant. For an embodiment that measures torque by rotating the part holding assembly plus the part at an angular speed, the perpendicular weight forces 208, 224 may change as the angular position changes. If the change in angular position is small, the change in the perpendicular weight forces 208, 224 will also be small, so an average perpendicular weight force 208, 224 may be assumed.

One methodology for calculating the updated distance ($D_2'$) 210 from the center of rotation (COR) 214 for the counter weight (CW) 202 is to assume that the weight (i.e., CW force or $W_2$) 204 of the counter weight (CW) 202 is known, that the weight (i.e., COG force or $W_1$) of the part plus the part holding assembly and excluding the counter weight (CW) 202 is known, that the initial distance ($D_2$) 212 from the center of rotation 214 of the counter weight 202 is known, and that the current angle (θ) 206 of the column center line 228 from the vertical center line 218 is known. The part plus part holding assembly (excluding the counter weight) has a center of gravity (COG) 220 that is an unknown distance ($D_1$) 216 from the center of rotation 214 on the opposite side of the center of rotation 214 from the counter weight (CW) 202 along the column 226. The perpendicular force applied by the counter weight force ($W_2$) 204 and the part plus assembly force ($W_1$) may be derived with force vectors translated to the column center line 228 as a function of the angle (θ) 206 between the vertical center line 218 and the column center line 228. A generalized equation for a weight (W) is given in Eq. 3.

$$\text{Perpendicular\_Force} = W\sin(\Theta) \quad \text{Eq. 3}$$

In accordance with Eq. 1 and Eq. 3, the initial net torque ($\tau_{init}$) applied by the initial conditions may be represented by Eq. 4.

$$\tau_{init} = D_1 W_1 \sin(\Theta) - D_2 W_2 \sin(\Theta) \quad \text{Eq. 4}$$

The torque (τ) with the counter weight (CW) 202 at the initial distance ($D_1$) may be measured, as described above, as a function of the power delivered to drive the shoulder drive to hold the part holding assembly against gravitational forces and/or as a function of the power delivered to drive the shoulder drive at an angular speed via Eq. 2. With the initial torque ($\tau_{init}$) known, the system of Eq. 4 may be solved for the unknown distance ($D_1$) 216 from the center of rotation 214 to the center of gravity 220 of the part plus part holding assembly (excluding the counter weight 202) as shown in Eq. 5.

$$D_1 = \frac{\tau_{init} + D_2 W_2 \sin(\Theta)}{W_1 \sin(\Theta)} \quad \text{Eq. 5}$$

Once the distance $D_1$ 216 is calculated (Eq. 5), then it is possible to solve for an updated system having an updated distance ($D_2'$) 210 of the counter weight (CW) 202 from the center of rotation 214 that has an net torque of 0 such that the counter weight 202 balances the part plus part holding assembly (excluding the counter weight) as shown in Eqs. 6-9 where Eq. 8 is the actual updated position ($D_2'$) 210 and Eq. 9 is the change in from the initial position ($D_1$) 212 to get to the updated position ($D_2'$) 210.

$$0 = \frac{\tau_{init} + D_2 W_2 \sin(\Theta)}{W_1 \sin(\Theta)} W_1 \sin(\Theta) - D_2' W_2 \sin(\Theta) \quad \text{Eq. 6}$$

$$0 = \tau_{init} + D_2 W_2 \sin(\Theta) - D_2' W_2 \sin(\Theta) \quad \text{Eq. 7}$$

$$D_2' = \frac{\tau_{init} + D_2 W_2 \sin(\Theta)}{W_2 \sin(\Theta)} = \frac{\tau_{init}}{W_2 \sin(\Theta)} + D_2 \quad \text{Eq. 8}$$

$$\Delta D_2 = \frac{\tau_{init}}{W_2 \sin(\Theta)} \quad \text{Eq. 9}$$

As understood by a person skilled in the art, other methodologies may be used to calculate the updated position ($D_2'$) 210 of the counter weight (CW) 202 from the center of rotation 214.

Figure 3:
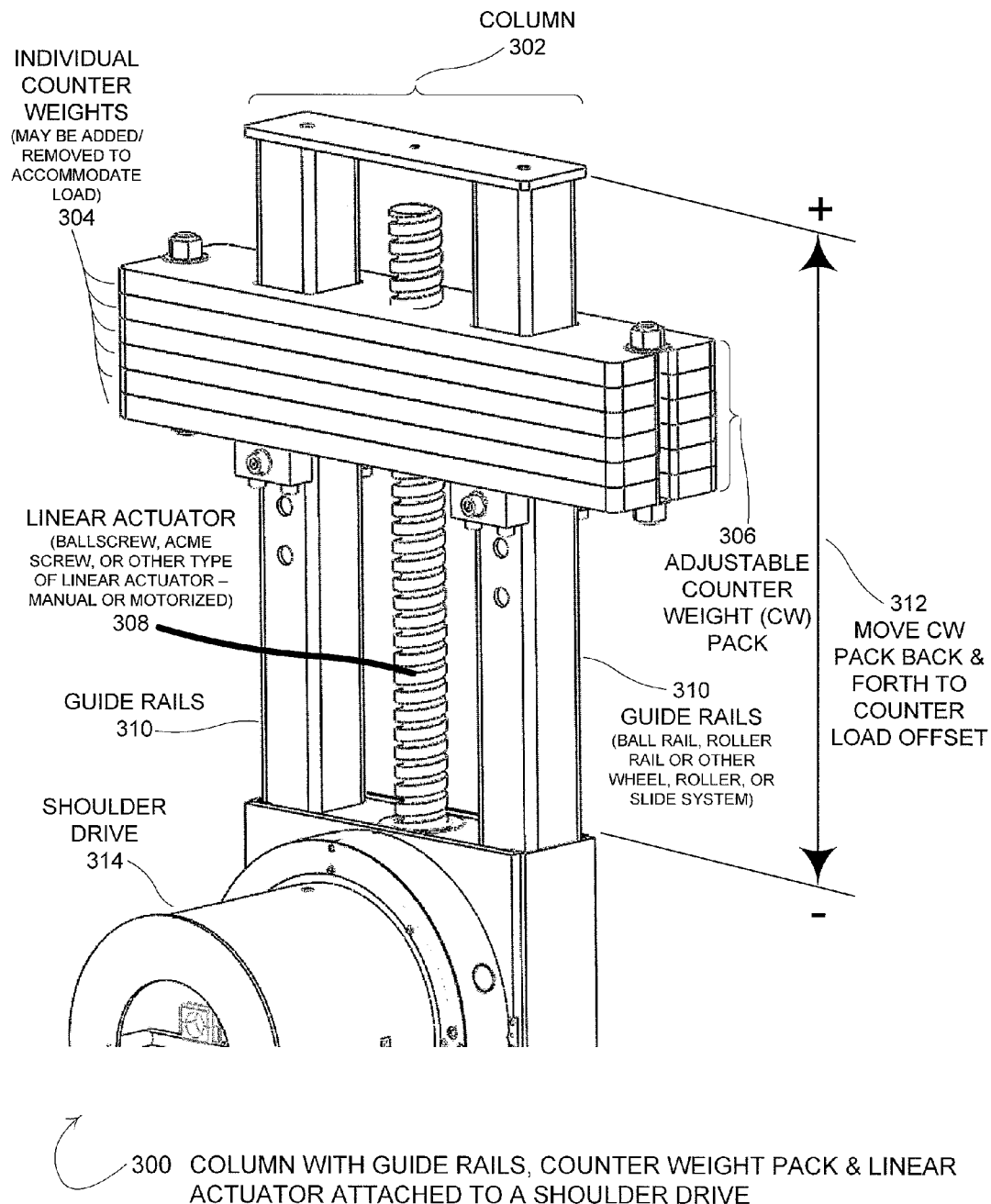
FIG. 3 is a three-dimensional diagram of a blown up view of a column with guide rails, counter weight pack, and linear actuator attached to a shoulder drive of a counter weight portion of a load compensation system.

FIG. 3 is a three-dimensional diagram 300 of a blown up view of a column 302 with guide rails 310, counter weight pack 304, and linear actuator 308 attached to a shoulder drive 314 of a counter weight portion of a load compensation system. The column 302 shown in the diagram 300 of FIG. 3 may be the head column 302 of a Drop Center H type part positioner or the single column of a SkyHook type part positioner. The counter weight pack 306 of an embodiment may be adjusted up and down along the column guide rails 310 (i.e., back and forth along the length of the column 302). The up and down movement may be changed to a side-to-side movement if the column 302 (i.e., part holding assembly) is turned so that the column is no longer vertical (e.g., the column is horizontal). The guide rails 310 of an embodiment provide a structure to support the counter weight pack 306 and permit the counter weight pack 310 to be moved 312 in either direction along the length of the column 302. To ease the movement 312 of the counter weight pack 306, the guide rails 310 may be designed as a ball rail, roller rail, or some other type of wheel, roller, or slide system that aids the movement of the counter weight pack 306 by the linear actuator 308. The linear actuator 308 of an embodiment moves the counter weight pack 306 back and forth 312 along the length of the column 302. Potential types of linear actuators 308 for an embodiment include: ballscrew, acme screw, and any other type of linear actuator capable of moving the counter weight pack 306 along the length of the column 302. The linear actuator 308 may be driven either manually or by a motor. If the linear actuator 308 is manually driven, the load compensation system will need to provide a communication interface to the user to inform the user where to place the counter weight pack 306 using the manually driven linear actuator 308. If the linear actor 308 is motorized, the load compensation system may automatically move 312 the counter weight pack 306 over the column 302 guide rails 310 as calculated by the load compensation system. The load compensation system may determine the direction and amount of movement 312 of the counter weight pack 306 based on a torque measurement of the shoulder drive 314 when the part and part holding assembly are rotated at least partially around the shoulder drive 314 axis of rotation (i.e., the shoulder center line). The counter weight pack 306 may be a single piece or may be comprised of multiple individual counter weights 304. If the counter weight pack 306 is comprised of multiple individual counter weights 304, the individual counter weights 304 may be added or removed to handle very heavy or very light parts, respectively.

In the embodiment shown in FIG. 3, the guide rails extend outward from the shoulder drive 314 on the opposite side of the shoulder center line from the part holding beam (not pictured). For practical purposes, the length of the column on each side of the shoulder drive 314 is typically equal to each other to permit a maximum offset from the shoulder 314 center line for the counter weight pack 306 movement 312 without increasing the overall envelope of the part holding assembly as the part holding assembly is rotated by the shoulder drive 314. Other embodiments may choose to make the column length on the opposite side of the shoulder drive 314 from the part holding beam shorter or longer as may be acceptable for a particular application. As pictured in FIG. 3, having the guide rails 310 on only the opposite side of the shoulder drive from the part holding beam only permits movement 312 of the counter weight pack 306 over the length of the column on the non-part holding beam side of the shoulder drive 314. For many applications, adjusting the counter weight pack 306 over the column 302 length on the non-part holding beaming side of the shoulder drive 314 may be satisfactory since there is a high likelihood that the balanced location for the counter weight pack 306 will reside in the available movement region 312 since the beam and part center of gravity is likely on the opposite side of the shoulder 314 center line from the guide rails 310 and counter weight pack 306. If a target part were particularly long and top heavy, it may be necessary to move the counter weight pack over the entire length of the column 302. Moving the counter weight pack 306 over the entire column 302 length may be particularly applicable for a SkyHook type part positioner with a tail stock for the part holding platter (see FIGS. 4A & B).

Figure 5:
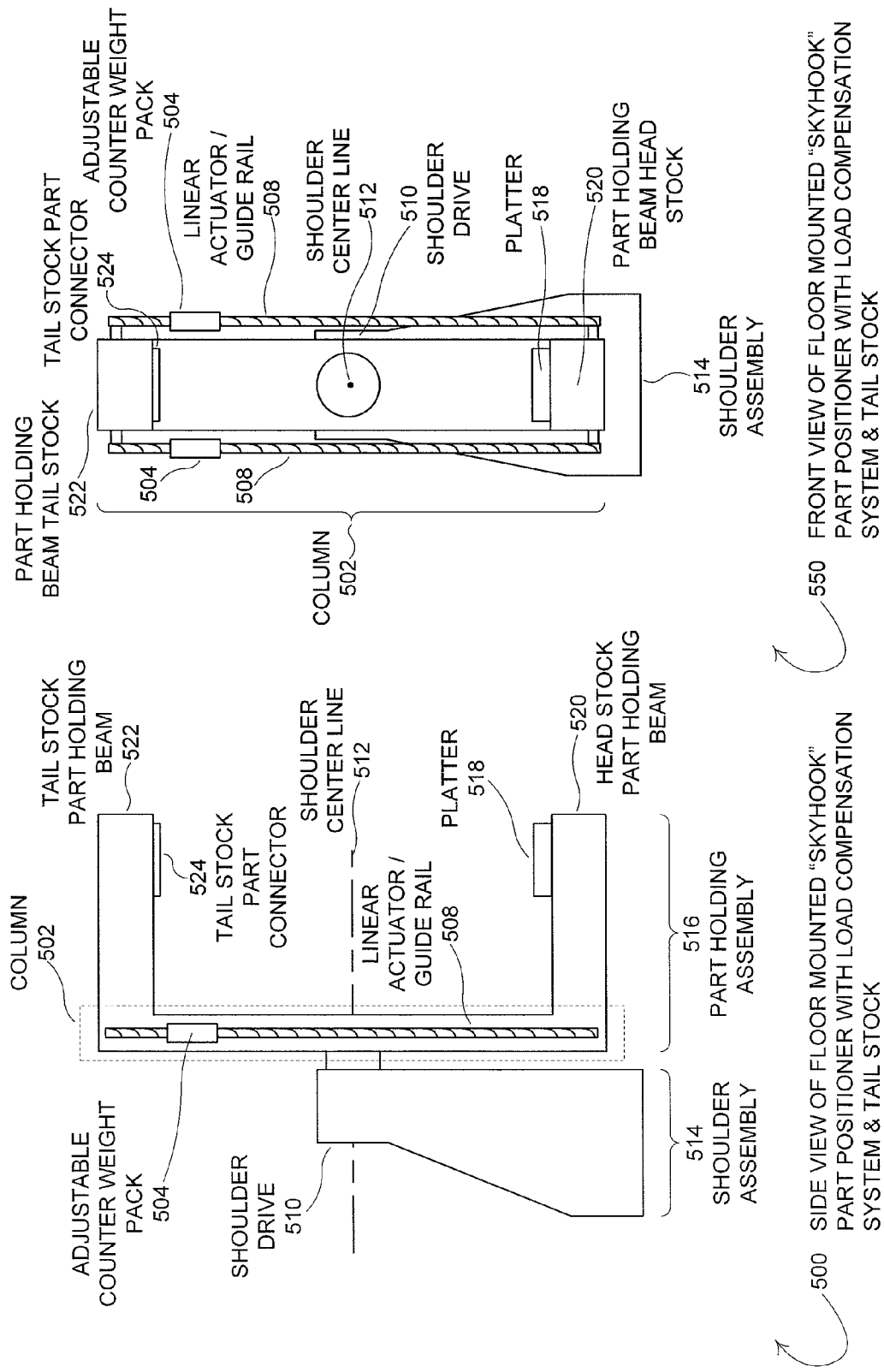
FIG. 5A is a diagram of a side view of a floor mounted "SkyHook" part positioner system with a load compensation system and a tail stock for the platter part attachment.
FIG. 5B is a diagram of a front view of a floor mounted "SkyHook" part positioner system with a load compensation system and a tail stock for the platter part attachment.

Many systems may be utilized to permit a counter weight pack 306 to be moved along the entire length of the column 302. For space considerations, it may be necessary to incorporate the guide rail structure 310 into the structure of the linear actuator 308 so that the weight pack is both supported by and moved by the linear actuator 308. Some potential schemes to accommodate movement of the counter weight pack 306 along the entire length of the column 302 may include attaching two counter weight packs 306 and linear actuators 308 to the back or sides of the column such that the counter weight pack(s) may be moved over the column without interference from the shoulder drive 314 attachment (see FIGS. 5 A & B for an example of putting the counter weight pack 306 on the sides of the column 302). It may also be possible to place the guide rails 310, counter weight pack 306, and linear actuator 308 on the inside face of the column such that the counter weight pack 306 is moved past the shoulder drive 314 connection to the column 302 on the side of the column facing the target part. Another embodiment may utilize two systems similar to the system shown in FIG. 3 where one counter weight pack 306 is adjustable 312 over the non-part holding beam side of the column 302 and a second counter weight pack 306 is adjustable over the part holding beam side of the column 302. Depending on the desired location of counter weight to balance the combined total load, one or the other of the two counter weight packs 306 may be placed as close to the shoulder 314 center line as possible to minimize the effect of the unused counter weight pack 306 on the combined total load center of gravity with respect to the shoulder 314 center line. For an embodiment, a system that permits at least one counter weight pack 306 to be moved 312 over a desired portion of the length, up to and including the entire length, of the column 302 by a linear actuator 308 sufficiently permits an embodiment to properly function to balance the combined load.

Figure 4:
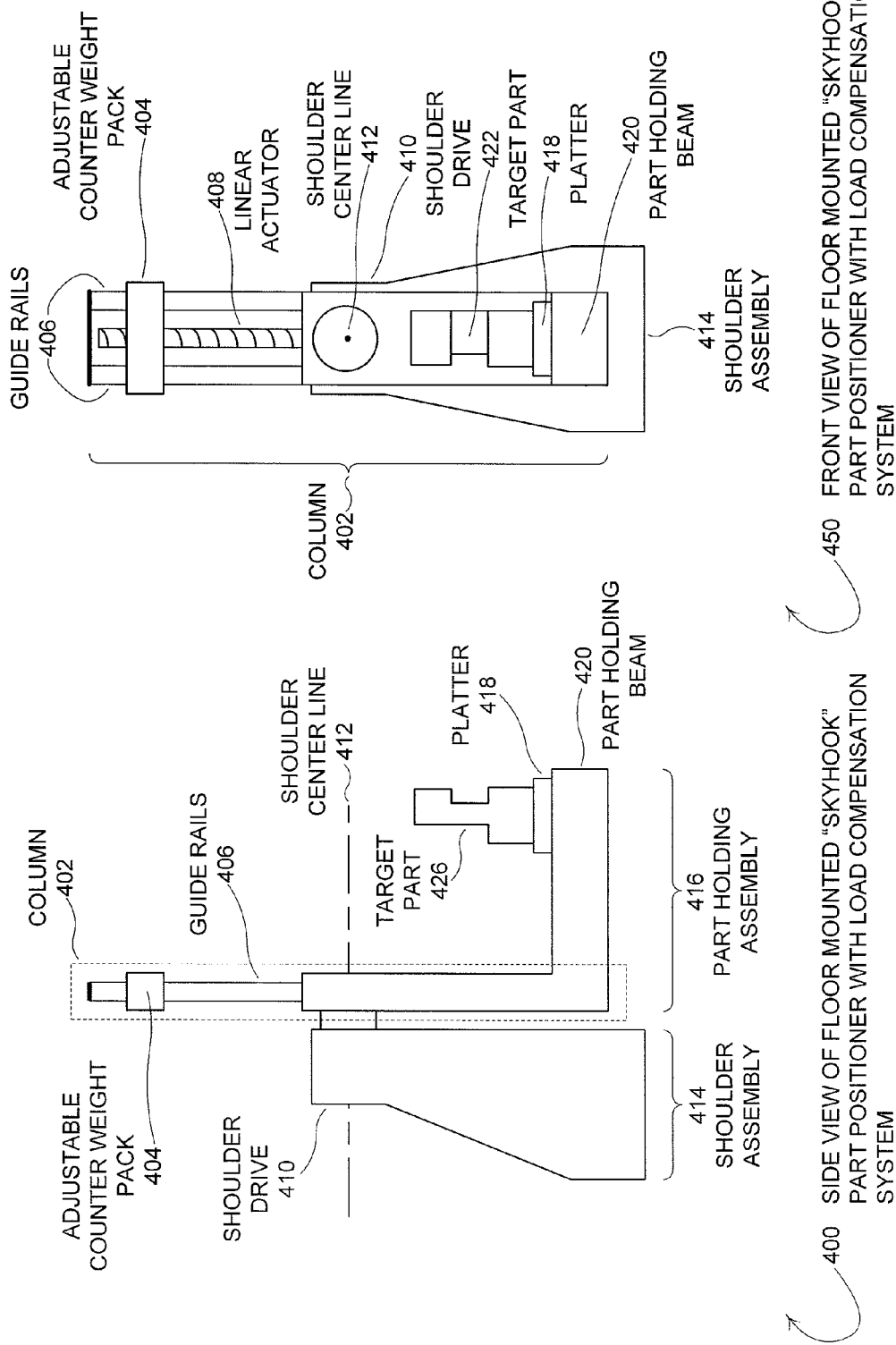
FIG. 4A is a diagram of a side view of a floor mounted "SkyHook" part positioner system with a load compensation system.
FIG. 4B is a diagram of a front view of a floor mounted "SkyHook" part positioner system with a load compensation system.

FIG. 4A is a diagram of a side view 400 of a floor mounted "SkyHook" part positioner system with a load compensation system. FIG. 4B is a diagram of a front view 450 of a floor mounted "SkyHook" part positioner system with a load compensation system. The SkyHook part positioner is similar to the Drop Center H part positioner described in the disclosure with respect to FIG. 1. A SkyHook part positioner is essentially half of a Drop Center H part Positioner where the SkyHook part positioner removes the "tail stock" half of the Drop Center H part positioner after the platter and retains the "head stock" half of a Drop Center H part positioner. The principle of operation of the counter weight pack 404 is the same for a SkyHook part positioner as for the Drop Center H part positioner described in the disclosure with respect to FIG. 1, except that there is only the "head" column 402 and no "tail" column. FIGS. 4A & B show how a target part 426 may be loaded on/attached to the platter 418. To simplify somewhat complex figures, a target part was not shown in diagram 100 of the Drop Center H part positioner of FIG. 1 or the SkyHook with platter tail stock shown in diagrams 500, 550 of FIGS. 5A & B. A target part similar to target part 426 may be loaded on/attached to the platter or part holding beam of the part positioners shown in FIGS. 1 and 5A & B.

The SkyHook part positioner shown in side 400 and front 450 views in FIGS. 4A & B has a shoulder drive 410 that corresponds to the head stock of the Drop Center H part positioner described in the disclosure with respect to FIG. 1. The shoulder drive 410 rotates the part positioner assembly 416 with the target part 426 attached to the platter 418 around the shoulder center line 412. The part holding assembly 416 includes a part holding beam 420 that runs parallel to the shoulder center line 412 and is attached to the column 402 at one end and is unattached (i.e., free floating) at the other end. The lack of a tail stock on the shoulder center line 412 for the SkyHook part positioner may permit greater flexibility in placing a robot to work on the target part 426 being positioned by the SkyHook positioner. Similar to the columns of the Drop Center H part positioner described in the disclosure with respect to FIG. 1, the SkyHook part positioner column 402 extends perpendicularly from the part holding beam 420 to the shoulder center line 412 and attaches the part holding beam 420 to the shoulder drive 410 that rotates the part holding assembly 416 to properly position the target part 426 to be operated on by a robot. The platter 418 may further rotate the target part 426 to properly place the target part 426 to be operated on by the robot. An embodiment may use the linear actuator 408 to move the counter weight pack 404 to balance the combined load of the part holding assembly 416 and the target part 426 with respect to the shoulder center line (aka. shoulder drive rotational axis) 412. An embodiment may use one or more torque measurements obtained from the shoulder drive 414 when the shoulder drive 414 is used to at least partially rotate the part holding assembly 416 about the shoulder center line 412 to determine where to locate the counter weight pack 404 on the column 402 guide rails 406.

FIG. 5A is a diagram of a side view 500 of a floor mounted "SkyHook" part positioner system with a load compensation system and a tail stock for the platter part attachment. FIG. 5B is a diagram of a front view 550 of a floor mounted "Sky-Hook" part positioner system with a load compensation system and a tail stock for the platter part attachment. The SkyHook part positioner of FIGS. 5A & B is the same as the SkyHook part positioner of FIGS. 5A & B with the addition of a "tail stock" section 522, 524 for the platter part attachment axis. The addition of the platter tail stock section 522, 524 may be desired to handle large, long or otherwise awkward target parts. The SkyHook part positioner with platter tail stock 522, 524 shown in side 500 and front 550 views in FIGS. 5A & B has a shoulder drive 510 that rotates the part holding assembly 516 with the target part loaded on/attached between the platter 518 and tail stock part connector 524 around the shoulder center line 512. The part holding assembly 516 includes a head stock part holding beam 520 and a tail stock part holding beam 522 that both extend parallel to the shoulder center line 512 but on opposite sides of the shoulder center line 512. The head stock 520 and tail stock 522 part holding beams attach to the column 502 at one end of the beams 520, 522 and are unattached (i.e., free floating) at the other end of the beams 520, 522. The SkyHook part positioner column 502 extends perpendicularly from the head stock part holding beam 520 through the shoulder center line 512 to attach to the tail stock part holding beam 522. The column 502 also attaches the head stock 520 and tail stock 522 part holding beams to the shoulder drive 510 that rotates the part holding assembly 516 to properly position the target part to be operated on by a robot. The platter 518 and tail stock part connector 524 may further rotate the target part around the platter rotational axis to properly place the target part to be operated on by the robot. An embodiment may use the linear actuator 508 to move the counter weight packs 504 to balance the combined load of the part holding assembly 516 and the target part with respect to the shoulder center line 512.

Because the target part extends over both sides of the shoulder center line 512 to attach to the platter 518 and the tail stock part connector 524, The center of gravity of the part holding assembly 516 combined with the loaded target part is equally as likely to be located on either side of the shoulder center line 512. Thus, it may be necessary to provide a structure that permits the counter weight(s) 504 to be moved over the entire length of the column 502. Various potential means to permit counter weight 504 movement over the entire length of the column are described further in the disclosure with respect to FIG. 2. The SkyHook positioner shown in FIGS. 5A & B shows linear actuators 508 attached to the sides of the column 502 to avoid passing the counter weight packs 504 through the shoulder drive 510 attachment in situations where it may be necessary to place the counter weight pack(s) 504 on either side of the shoulder center line 514. The linear actuators 508 shown on the SkyHook part positioner of FIGS. 5A & B also double as the guide rails 508 for the counter weight packs since the column 502 side attachment of the linear actuators 508 may limit space availability for separate guide rails 508 and linear actuators 508.

Figure 6:
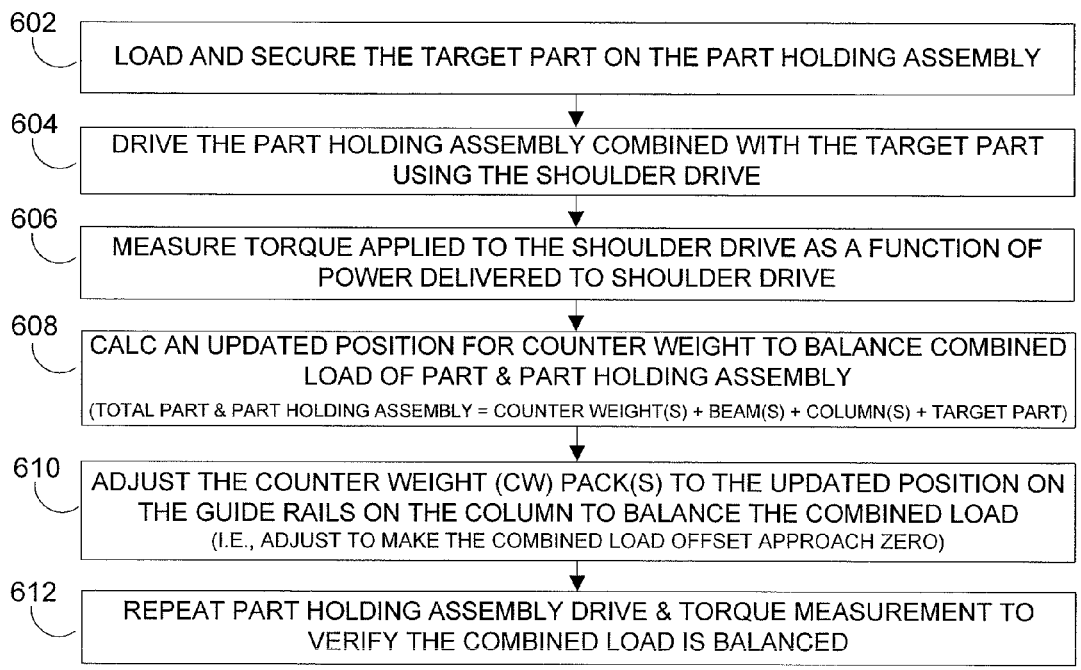
FIG. 6 is a flow chart of the operation of an offset calculation based load compensation system on a part positioner.

FIG. 6 is a flow chart 600 of the operation of an offset calculation based load compensation system on a part positioner. At step 602, a target part is loaded and secured on the part holding assembly of the part positioner. At step 604, the shoulder drive is used to drive the part holding assembly combined with the target part. At step 606, the torque applied to the shoulder drive during the drive in step 604 is measured as a function of power supplied to the rotational shoulder drive. The power delivered to the shoulder drive may be correlated to the electrical current draw of the shoulder drive during the driving for a fixed voltage motor. At step 608, the updated position for the counter weight(s) to balance the total combined load of the part, part holding assembly, and counter weight(s) is calculated as a function the torque measured in step 606 (see also the disclosure with respect to FIG. 2). The combined load includes the counter weight(s), beam(s), and column(s) of the part holding assembly plus the load of the target part. At step 610, the counter weight pack(s) are adjusted using the linear actuator back and forth (i.e., up and down when the column is in the vertical position) along the guide rails on the column to the updated position calculated in step 608 in order to balance the combined load with respect to the shoulder drive rotational axis. In other words, the counter weight pack(s) position on the column(s) is adjusted to make the combined load offset approach zero. At step 612, the torque measurement is repeated by driving the part holding assembly combined with the target part again and measuring the torque to verify that the combined load is balanced.

Figure 7:
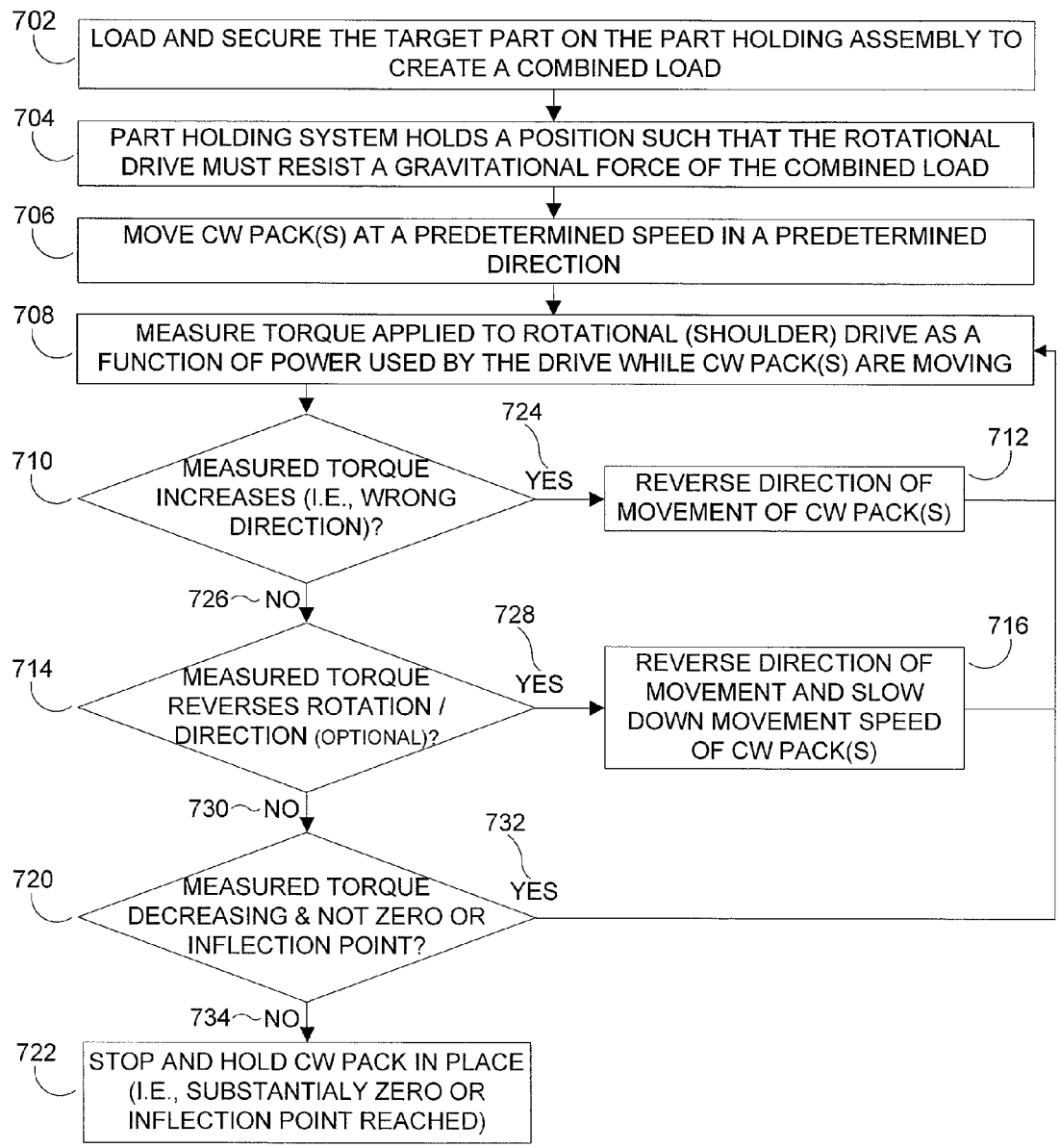
FIG. 7 is a flow chart of the operation of an empirical feedback load compensation system on a part positioner.

FIG. 7 is a flow chart of the operation of an empirical feedback load compensation system on a part positioner. At step 702, a target part is loaded and secured on the part holding assembly of the part positioner to create a combined load of the part and part holding assembly. At step 704, the part holding system holds the rotational drive of the part positioner such that the rotational drive must resist a torque supplied by gravitational force of the combined load. One skilled in the art will recognize that for many part positioning systems to achieve a sufficient torque the combined load may need to moved substantially away from a straight vertical angular position. At step 706 the counter weight pack (or packs) is moved in predetermined direction at a predetermined speed along the length of the column. At step 708 the torque applied to the rotational (i.e., shoulder) drive is measured as a function of power delivered to the rotational drive while the counter weight packs are moving. One skilled in the art will recognize that torque may be effectively measured using measurements of values that are proportional to the actual torque. For instance, the power delivered to the rotational drive may be measured and used directly to compare one torque measurement to another torque measurement since the power used is directly proportional to the torque applied for many systems. Similarly, the current drawn by the rotational drive may be used in a similar case in a fixed voltage system. Other measurements that are directly proportional to the applied torque may also be used (e.g., voltage in a fixed current system, albeit a rarely encountered system). At step 710, the system checks to see if the torque is increasing. If the torque is increasing 724, the system reverses the direction of movement of the counter weight pack at step 712 and returns to repeat step 708. If the measured torque is not increasing 726, the system may move to optional step 714 or skip directly to step 720. Step 714 checks to see if the measured torque has reversed direction (i.e., reversed the torque direction of rotation). If a reversal of the torque direction is detected 728, the system may reverse the direction and slow down the movement speed of the counter weight packs at step 716. After step 716, the system returns to step 708. Performing steps 714 and 716 are optional if increasing the accuracy of the counter weight placement is desired. By reversing direction and slowing the speed of movement of the counter weight packs, the counter weight packs will go back over the point of inflection between the torque rotation directions at a slower speed, permitting the system to place the counter weight pack closer to the exact inflection point. The exact inflection point is the point of optimal balance which also is the location of the minimum torque applied to the rotational drive. Theoretically, the torque should be zero at the inflection point, but in real world systems the system may have losses, friction or other issues that do not permit a zero torque measurement (also may be measured as applied power and/or current to the rotational drive).

From step 710, if the measured torque is not increasing 726, the system may move to step 720. However, if optional step 714 is included, the system will move to step 720 if the measured torque has not reversed rotational direction 730. At step 720, the system checks the measured torque to ensure that the torque is still decreasing and has not reached a substantially zero value and has not detected an inflection point in the torque rotational direction. If the torque is still decreasing and is not zero or at an inflection point 732, the system returns to step 708. If the measured torque is substantially zero or an inflection point in the rotational direction of the torque is detected 734, then the system stops and holds the counter weight pack in place at the point of the substantial zero or inflection point measurement. Further, if the torque is no longer decreasing 734, the counter weight pack may have reached the end of the length of column and the effective counter force that may be applied by the counter weight has been reached (i.e., the minimum torque achievable by the system).

One skilled in the art will recognize that any part positioner with a rotational drive rotating a part and the part holding assembly about the rotational axis of the rotational drive may be utilized. Affixing a column to the part holding assembly that is perpendicular to the rotational axis permits a counter weight pack to attached and moved along a length of the column such that the counter weight pack may counter act the rotational forces applied by rotating the part and part holding assembly. Further, one skilled in the art will recognize that more than one column may be utilized to provide a structure for multiple counter weight packs. Also, one skilled in the art will recognize that multiple weight packs may be used on the same column.

Figure 8:
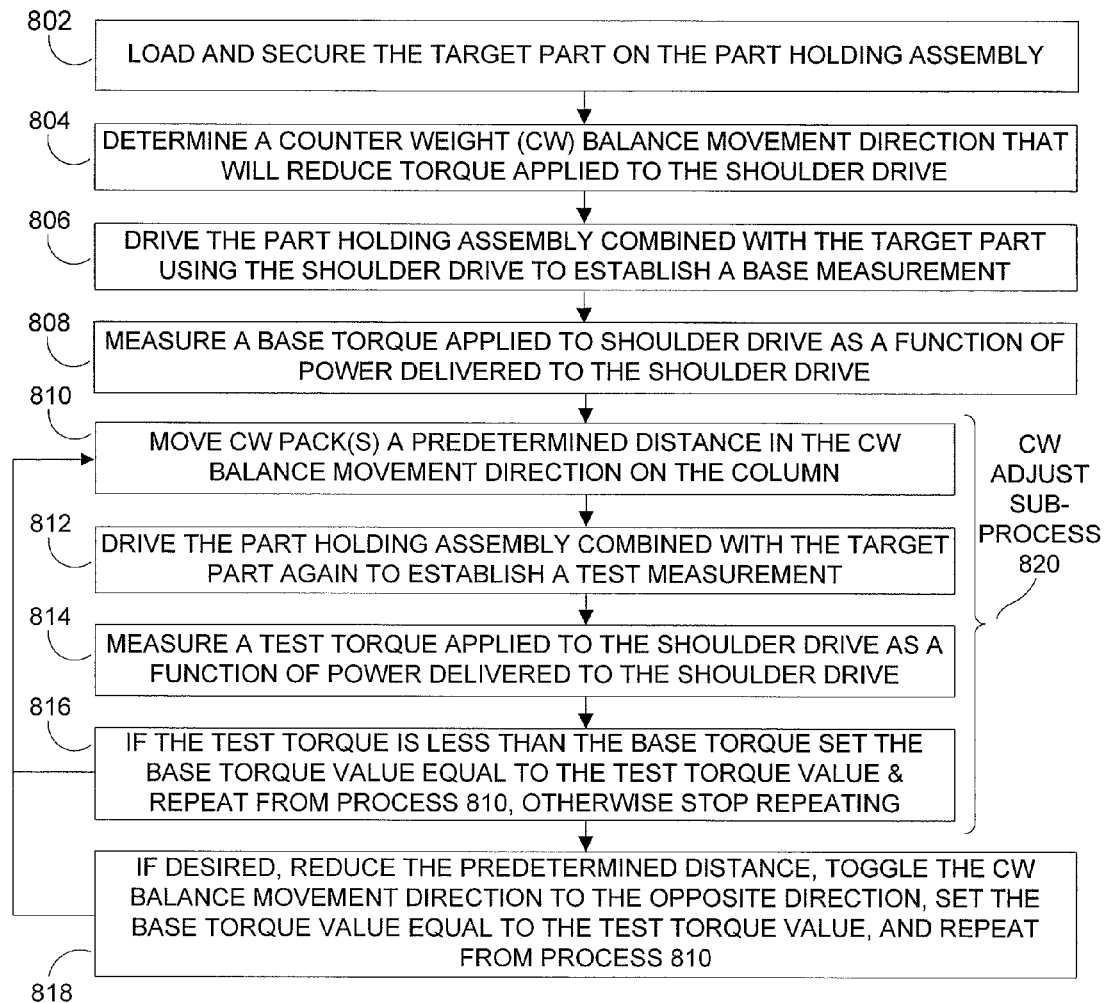
FIG. 8 is a flow chart of the operation of a step based empirical feedback load compensation system on a part positioner.

FIG. 8 is a flow chart 800 of the operation of a step based empirical feedback load compensation system on a part positioner. When referring to "step-based", it is intended to denote that the counter weight pack is moved in incremental steps for each measurement. At step 802, a target part is loaded and secured on the part holding assembly of the part positioner. At step 804, a counter weight balance movement direction for moving the counter weight packs along the guide rails on the column is determined such that moving the counter weight pack(s) in the counter weight balance movement direction will reduce the torque applied by the shoulder drive to rotate the part holding assembly combined with loaded target part. One means to select the counter weight balance movement direction is to move the counter weight pack(s) to either end of the column and then to set the counter weight balance direction to move the counter weight pack(s) in the direction toward the opposite end of the column. A second means would utilize two torque measurements at the rotational shoulder drive to determine the correct counter weight balance movement direction and is described in greater detail in the disclosure with respect to FIG. 9. At step 806, the shoulder drive is used to drive the part holding assembly combined with the target part in order to establish a base measurement. At step 808, the torque applied to the shoulder drive during the base rotation in step 806 is measured as a function of power supplied to the rotational shoulder at step 806. The power delivered to the shoulder drive may be correlated to the electrical current draw of the shoulder drive during the driving for a fixed voltage motor. At step 810, the counter weight pack(s) is moved a predetermined distance along the column length in the counter weight balance movement direction determined at step 804. At step 812, the shoulder drive is used to drive the part holding assembly combined with the target part in order to establish a test measurement. At step 814, the torque applied to the shoulder drive during the test rotation in step 812 is measured as a function of power supplied to the rotational shoulder drive to at step 812. At step 816, if the test torque measurement is less than the base torque measurement (i.e., the torque is being reduced by the counter weight movement), then the base torque measurement value is set equal to the test torque measurement value and steps 810-816, making up a counter weight adjustment sub-process 820, are repeated. At step 816, if the test torque measurement is not less than the base torque measurement (i.e., the torque is being increased by the counter weight movement), then the counter weight pack(s) has crossed the optimal location for the counter weight pack(s) in the last counter weight pack(s) movement (at step 810) and the counter weight adjustment sub-process is ended.

As also shown in FIG. 8, at step 818, if desired, the predetermined distance may be reduced, the counter weight balance direction toggled to the opposite direction along the column length, the base torque value set equal to the test torque value, and the counter weight adjustment process 820 may be restarted using the reduced predetermined distance in order to increase the accuracy (i.e., decrease the margin of error) of the final counter weight location. When restarting the counter weight adjustment process 820 with a reduced predetermined distance, the counter weight balance movement direction is toggled to the opposite direction because the last movement of the counter weight pack(s) at step 810 caused the counter weight pack to go past the optimal counter weight pack(s) location. The base torque value is set equal to the test torque value in order to establish a base measurement to compare the next test measurement to after the counter weight pack(s) is moved again in the next iteration of the counter weight adjustment process 820. Step 818 permits a load compensation system to narrow down the counter weight pack(s) final location to a position within a reasonable margin of error of the theoretical optimum location for the counter weight pack(s). By starting with a large predetermined distance, the counter weight pack(s) may be quickly moved to a point near the theoretical optimum position and then fine tuned by performing the same process 820 with a reduced predetermined distance. Multiple stages of predetermined distances may be used to gradually narrow down the final location for the counter weight pack while keeping the number of test rotations to a minimum. For instance, an initial predetermined distance may be 24 inches, which will permit the counter weight pack(s) to be moved to within 24 inches of the theoretical optimum location in a few move cycles. The predetermined distance may then be reduced to 6 inches, permitting the counter weight pack(s) to be moved to within 6 inches of the theoretical optimum location in a few more cycles (i.e., no more than 4 move cycles once the counter weight pack is within 24 inches of the optimum location). The predetermined distance may be reduced again to 1 inch, permitting the counter weight pack(s) to be moved to within 1 inch of the theoretical optimum in a few more move cycles (i.e., no more than 6 move cycles once the counter weight pack is within 6 inches of the optimum location). In contrast, if the counter weight pack needed to be moved 58 inches to be within one inch of the theoretical optimum location, an initial predetermined distance of 1 inch would require 58 move cycles while the 24/6/1 inch predetermined distance progression would require only 3 move cycles at 24 inches each move (72 inches), 3 move cycles in the opposite direction at 6 inches each move (18 inches of moves back to 54 inches from the original location), and 4 move cycles at 1 inch each move to reach the 58 inch location. Thus, the 24/6/1 inch predetermined distance progression would require only 10 move cycles to achieve the same result as the 58 move cycles needed when using the 1 inch predetermined distance alone.

A potential error condition may be encountered when the counter weight pack(s) does not provide sufficient counter weight to balance the combined load of the target part combined with the part holding assembly without further extending the column length to create a longer moment arm. Since extending the column length may be impractical due to the rotational work envelope of the part positioner system, it would likely be more practical to add additional weight to the counter weight pack(s) to resolve the error condition. Another error condition may occur if there is not a measurable difference in torque values between the base and the test torque measurements. Having no measurable torque difference may indicate that the counter weight is not heavy enough to properly affect the center of gravity and/or the predetermined distance that the counter weight pack(s) is moved is too small to permit a measurable change in the torque value between counter weight pack(s) moves.

Figure 9:
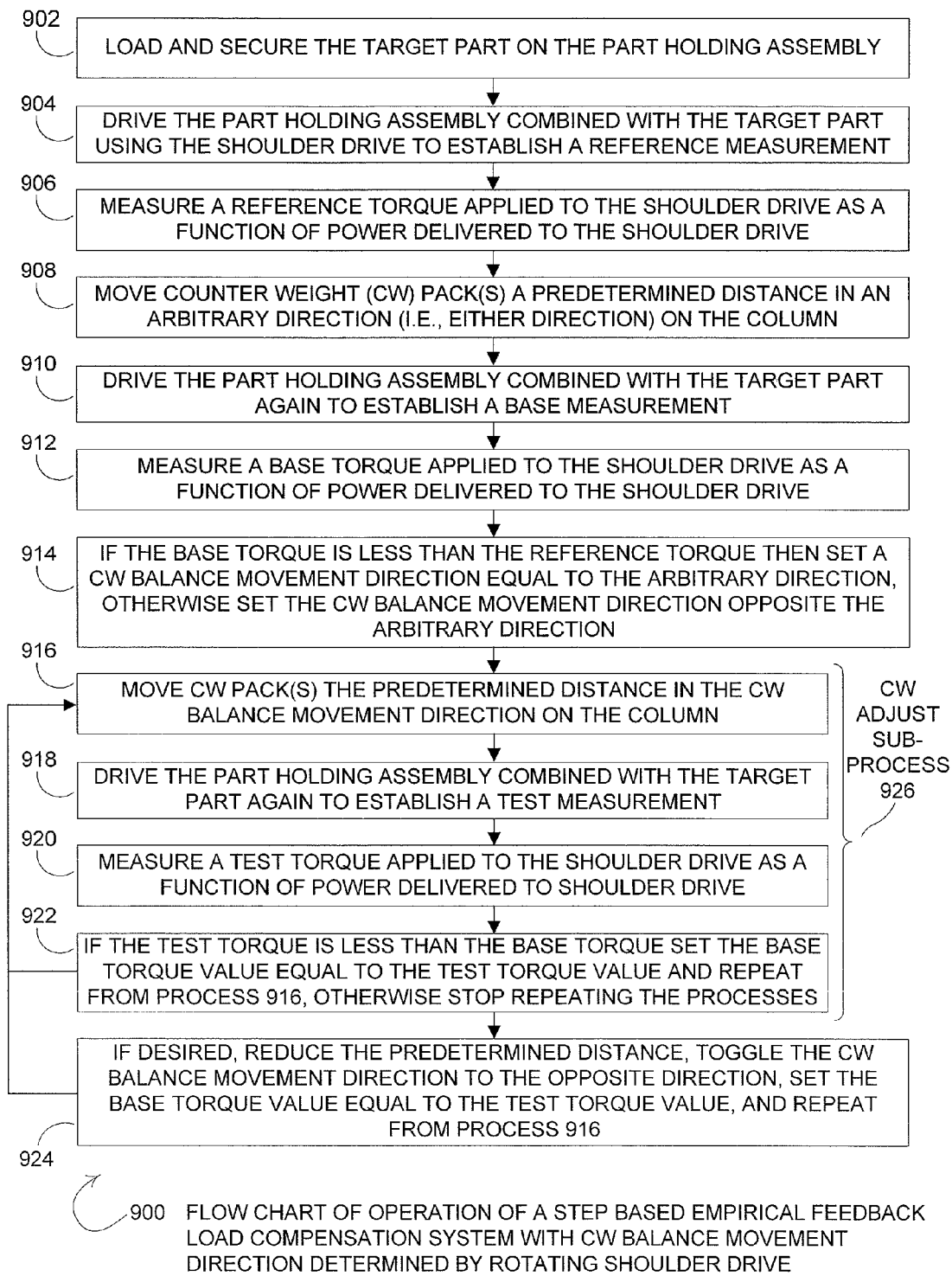
FIG. 9 is a flow chart of the operation of a step based empirical feedback load compensation system on a part positioner where the counter weight balance movement direction is determined by rotating the combined load with the shoulder drive.

FIG. 9 is a flow chart 900 of the operation of a step based empirical feedback load compensation system on a part positioner where the counter weight balance movement direction is determined by rotating the combined load with the shoulder drive. The flow chart 900 of FIG. 9 follows much the same progression as the flow chart 800 of FIG. 8, except that the determination of the counter weight balance movement direction of step 804 is laid out in further detail for an embodiment that determines the counter weight balance movement direction by driving the target part and part holding assembly combined load with the rotational shoulder drive. At step 902, a target part is loaded and secured on the part holding assembly of the part positioner. At step 904, the shoulder drive is used to drive the part holding assembly combined with the target part in order to establish a reference measurement. At step 906, the torque applied to the shoulder drive during the reference driving in step 904 is measured as a function of power supplied to the rotational shoulder drive at step 904. At step 908, the counter weight pack(s) is moved a predetermined distance along the column length in an arbitrary direction (i.e., either direction) along the length of the column. The direction the counter weight pack(s) is moved is not important since the movement is being performed to determine the proper direction of movement for the counter weight pack(s) to reduce the torque applied by the shoulder drive for use in the feedback counter weight adjustment sub-process 926. At process 910, the shoulder drive is used to drive the part holding assembly combined with the target part in order to establish a base measurement. At step 912, the torque applied to the shoulder drive during the base rotation in step 910 is measured as a function of power supplied to the rotational shoulder drive at step 910. At step 914, if the base torque is less than the reference torque then the counter weight balance movement direction is set equal to the arbitrary direction of step 908. If the base torque is not less than the reference torque then the counter weight balance movement direction is set to the opposite direction of the arbitrary direction of step 908.

At step 916, the counter weight pack(s) is moved a predetermined distance along the column length in the counter weight balance movement direction set at step 914. At step 918, the shoulder drive is used to drive the part holding assembly combined with the target part in order to establish a test measurement. At step 920, the torque applied to the shoulder drive during the test driving in step 918 is measured as a function of power supplied to the rotational shoulder drive at step 918. At step 922, if the test torque measurement is less than the base torque measurement (i.e., the torque is being reduced by the counter weight movement), then the base torque measurement value is set equal to the test torque measurement value and steps 916-922, making up a counter weight adjustment sub-process 926, are repeated. At step 922, if the test torque measurement is not less than the base torque measurement (i.e., the torque is being increased by the counter weight movement), then the counter weight pack(s) has crossed the optimal location for the counter weight pack (s) in the last counter weight pack(s) movement (at step 916) and the counter weight adjustment sub-process is ended. At step 924, if desired, the predetermined distance may be reduced, the counter weight balance direction toggled to the opposite direction along the column length, the base torque value set equal to the test torque value, and the counter weight adjustment process 926 may be restarted using the reduced predetermined distance in order to increase the accuracy of the final counter weight location. When restarting the counter weight adjustment process 926 with a reduced predetermined distance, the counter weight balance movement direction is toggled to the opposite direction because the last movement of the counter weight pack(s) at step 916 caused the counter weight pack to go past the optimal counter weight pack(s) location. The base torque value is set equal to the test torque value in order to establish a base measurement to compare the next test measurement to after the counter weight pack(s) is moved again in the next iteration of the counter weight adjustment process 926. Other considerations for step 924 are discussed in relation to step 818 as discussed in disclosure with respect to FIG. 8.

Figure 10:
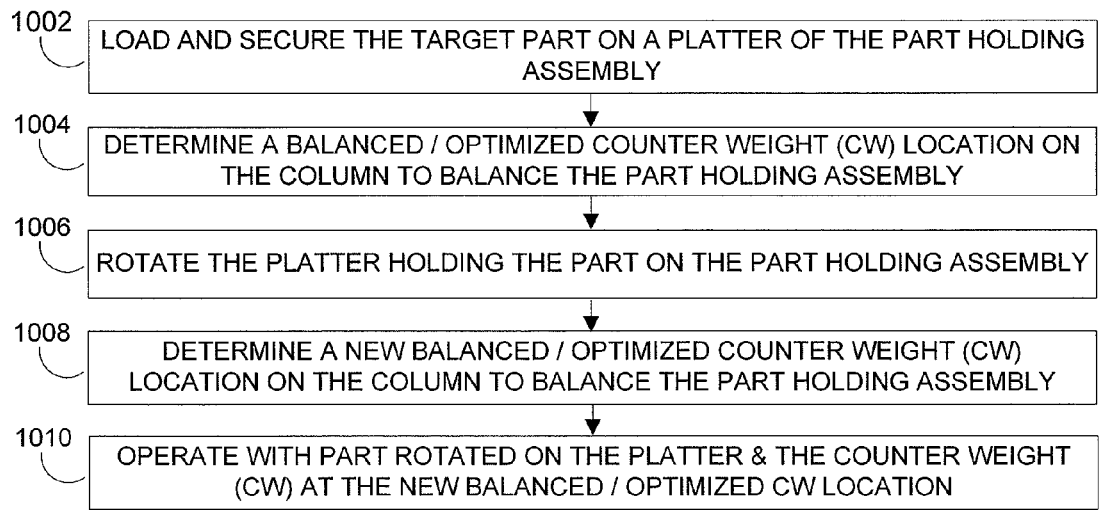
FIG. 10 is a flow chart of the operation to adjust for a part that is independently rotated on the part holding platter.

FIG. 10 is a flow chart of the operation to adjust for a part that is independently rotated on the part holding platter. At step 1002, a target part is loaded and secured on the part holding assembly of the part positioner to create a combined load of the part and part holding assembly. The part holding assembly has a rotational platter that holds the part. The rotational platter has an axis of rotation that is substantially perpendicular to the axis of rotation of the shoulder (i.e., main) rotational drive. At step 1004, the system determines a first location for the counter weight pack(s) on the column(s) that is optimized for balance of the part at a particular rotation of the platter using one of the embodiments of the invention disclosed herein. At step 1006 the platter is at least partially rotated such that the part is at a different rotation than for step 1004. At step 1008, the system determines a second location for the counter weight pack(s) on the column(s) that is optimized for balance of the part at the second rotation of the platter using one of the embodiments of the invention disclosed herein. At step 1010, the robot and part positioning system is operated to work on the part with the counter weights at the second location. Note that the system may also operate with the counter weights at the first location prior to at least partially rotating the part on the rotational platter. In other words, the system may update the counterweight placement as needed to accommodate different rotations of the part on the platter.

Figure 11:
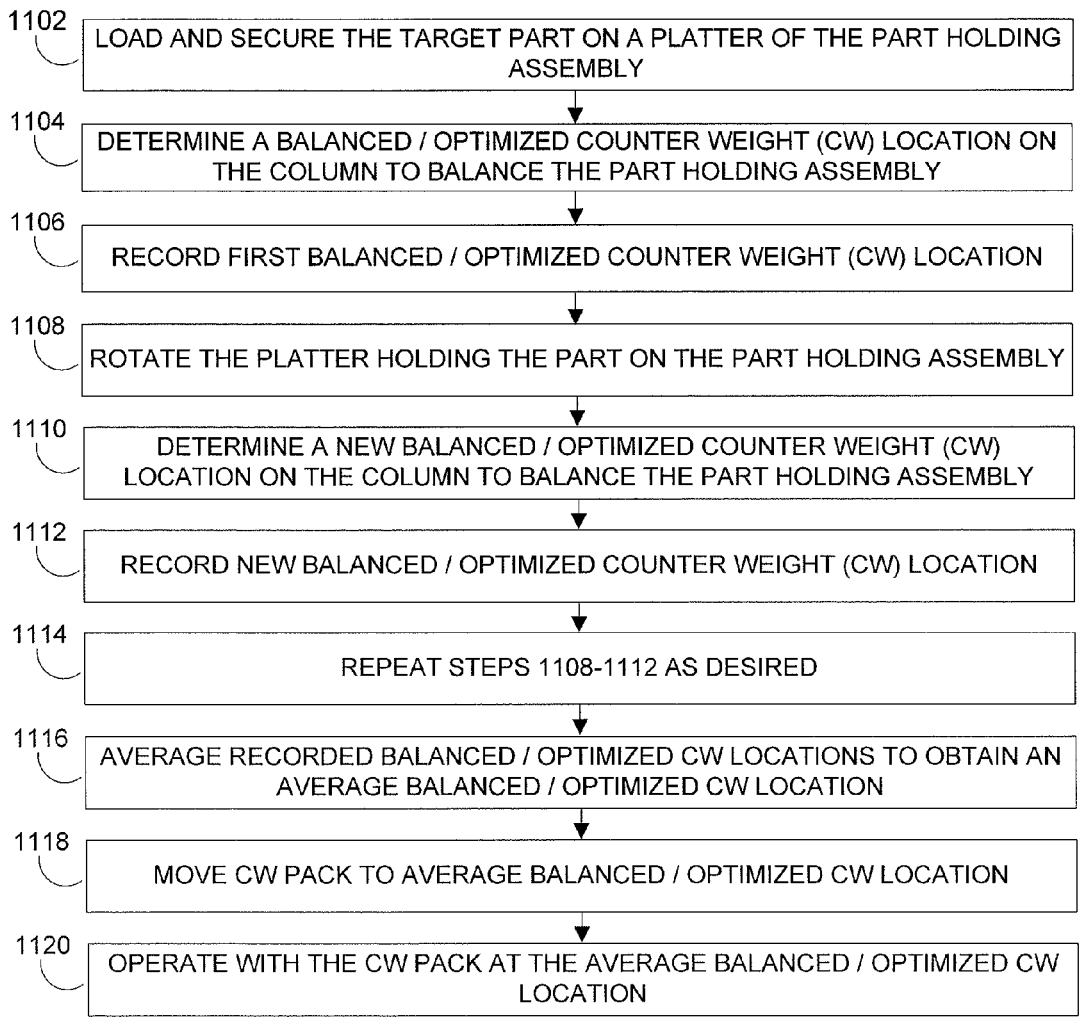
FIG. 11 is a flow chart of the operation to adjust to an average location for the counter weights for various rotations of the platter holding the target part.

FIG. 11 is a flow chart of the operation to adjust to an average location for the counter weights for various rotations of the platter holding the target part. At step 1102, a target part is loaded and secured on the part holding assembly of the part positioner to create a combined load of the part and part holding assembly. The part holding assembly has a rotational platter that holds the part. The rotational platter has an axis of rotation that is substantially perpendicular to the axis of rotation of the shoulder (i.e., main) rotational drive. At step 1104, the system determines a first location for the counter weight pack(s) on the column(s) that is optimized for balance of the part at a particular rotation of the platter using one of the embodiments of the invention disclosed herein. At step 1106, the system records the first location of the counter weight pack(s) on the column(s). At step 1108 the platter is at least partially rotated such that the part is at a different rotation than for step 1104 or previous step 1108s. At step 1110, the system determines an additional/new location for the counter weight pack(s) on the column(s) that is optimized for balance of the part at the new rotation of the platter using one of the embodiments of the invention disclosed herein. At step 1114, new rotations of the part on the platter are processed through steps 1108-1112 as desired to record sufficient data to average. At step 1116, the system averages the recorded first and additional/supplementary counter weight pack locations. At step 1118, the system moves the counter weight pack(s) to the average position of the counter weight pack. At step 1120, the robot and part positioning system is operated to work on the part with the counter weights at the average location. While the average position may not be optimal for the part at any particular platter rotation, the average position represents a good compromise between the various platter rotations so that recalibrating the count weight pack location after each time the platter is rotated may not be necessary.

Various embodiments may mount the part positioner system on surfaces other than the floor in contrast to the various floor mounted part positioners described in the figures. For instance, a part positioner may be mounted on a wall or any other surface capable of supporting the weight and applied forces exerted by the part positioner system if desired. Various embodiments may also be used to actively adjust the counter weight pack(s) location while a part is being positioned for work operations by the robot using torque measurements obtained from shoulder drive rotations used to position the target part to have operations performed by the robot. Hence, an optimum balance may be maintained even as the combined load offset changes due to the work being performed on the target part. Various embodiments may perform calculations and communicate counter weight movement instructions using a computer system running software to perform the necessary functions. Alternatively, various embodiments may perform calculations and communicate counter weight movement instructions using a dedicated electronic controller with sufficient processing power and memory to perform the necessary functions.

The various embodiments may provide numerous benefits for a part positioner system. Since the counter weight pack(s) may be quickly and easily moved to accommodate different target parts, a single part positioner and robot system may be used for a variety of target parts without the need to perform extensive calculations to find a new center of gravity of the combined load and without the time and labor required to physically adjust the size and location of the counter weight pack(s) on the column by manually unfastening (i.e., unbolting) the counter weight pack(s), physically moving the counter weight pack to a new location, and fastening (i.e., bolting) the counter weight pack(s) in place. Various embodiments may be particularly well suited for welding applications that require extensive part positioning needs for very large and awkward target parts. Further, a welding application may have included a significant change in the combined load offset due to the welding procedures. Thus, a welding application may benefit from a recalibration of the counter weight pack(s) while the target part is still being operated on by the robotic welder as is possible through various embodiments. Due to the improved combined load balance about the shoulder drive rotational axis, various embodiments may expand the range of target parts that may be loaded on a particular part positioner system. The expanded range is particularly evident for larger target part loads as the torque requirements for the shoulder drive are reduced due to the combined load balance improvements. Similarly, cost savings may be achieved since a smaller part positioning gear set up may be utilized for with better balanced load combined load of an embodiment. The operation of the rotational shoulder drive may also be improved as the speed and acceleration of the drive may improve due to the improvement in the combined load balance. Further, the wear and tear on the rotational shoulder drive is reduced resulting in longer part positioner system life.

Various embodiments may provide the control and management functions detailed herein via an application operating on a computer system (or other electronic devices). Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method to compensate for a combined load offset on a part positioner system that positions a part to be worked on by a robot comprising:
providing said part positioner system that has a shoulder with a rotational shoulder drive that rotates a part holding assembly around a shoulder center line, said shoulder center line being a line along an axis of rotation of said rotational shoulder drive, said part holding assembly comprising a column having a column length disposed substantially perpendicular to said shoulder center line;
providing a counter weight system for said column that has a counter weight pack that is moveable back and forth along at least a portion of said column length of said
column by a linear actuator;
loading said part to be worked on by said robot onto said
part holding assembly to create a combined load of said
part holding assembly and said part;
driving said combined load using said rotational shoulder
drive;
measuring a test torque on said rotational shoulder drive
during said driving of said combined load as a function
of angular position of said rotational shoulder drive and
power supplied to said rotational shoulder drive;
calculating an updated position for said counter weight
pack that substantially balances said combined load with
respect to said shoulder center line as a function of said
test torque;
adjusting said counter weight pack by said linear actuator
along said portion of said column length to said updated
position; and,
operating said part positioner system with a balanced combined total load to position said part to accommodate work operations of said robot.

2. The method of claim 1:
wherein said driving of said combined load using said rotational shoulder drive further comprises rotating said combined load over a change in angular position of said shoulder drive in a period of time; and,
wherein said measuring of torque on said rotational shoulder drive during said driving of said combined load determines torque as a function of power supplied to said rotational drive to rotate said combined load and a rotational speed that is a function of said change in angular position of said rotational shoulder drive in said period of time.

3. The method of claim 1:
wherein said driving of said combined load using said rotational shoulder drive further comprises driving said combined load at an angular position such that said rotational shoulder drive holds said combined load at said angular position and such that said angular position of said combined load provides a substantive weight for said shoulder drive to resist when holding said combined load at said angular position; and,
wherein said measuring of torque on said rotational shoulder drive during said driving of said combined load determines torque as a function of power supplied to said rotational drive to hold said combined load at said angular position, said angular position of said combined load, and a weight of said combined load.

4. The method of claim 1 wherein said part positioner system further comprises:
a part holding beam disposed parallel to said shoulder center line, said part holding beam being attached to said shoulder drive by said column;
a tail stock section for shoulder drive connected to said part holding beam by a second column disposed perpendicularly between said shoulder center line and said part holding beam, said tail stock section being attached to said second column with a rotational joint centered on said shoulder center line; and,
a second counter weight system for said second column that operates in concert with said counter weight system for said column attached to said shoulder drive.

5. The method of claim 1 further comprising adjusting said counter weight pack to balance said combined load while operating said part positioner system to position said part to accommodate work operations of said robot.

6. The method of claim 1 wherein said linear actuator is manually operated and movement commands for said linear actuator are communicated to an operator that manually operates said linear actuator.

7. The method of claim 1 wherein said linear actuator is motor operated and movement commands are sent to said motor operated linear actuator to automatically adjust said counter weight pack.

8. The method of claim 1 wherein said part positioner system is one of a type of the group comprising: a Drop Center H part positioner, a SkyHook part positioner, and a SkyHook with platter tail stock part positioner.

9. The method of claim 1 wherein said counter weight system further comprises guide rails to support and guide said counter weight pack as said counter weight pack is moved along said portion of said column length.

10. The method of claim 1 wherein said measuring of torque on said rotational shoulder drive measures a value proportional to torque.

11. The method of claim 10 wherein said value proportional to torque is at least one of the group comprising: actual torque applied by said rotational shoulder drive, current drawn by said rotational shoulder and power supplied to said rotational shoulder drive.

12. The method of claim 1 wherein said part holding assembly has a rotational platter with a platter axis of rotation that is substantially perpendicular to said shoulder centerline such that said part is attached to said platter and further comprising:
performing said method to compensate for said combined load offset on a part positioner system to locate a first balanced location on said column for said counter weight pack;
rotating said platter such that said part is rotated at least partially around said platter axis of rotation;
performing said method to compensate for said combined load offset on a part positioner system to locate a second balanced location on said column for said counter weight pack; and,
operating said part positioner system with said counter weight pack at said second balanced location on said column to position said part to accommodate work operations of said robot.

13. The method of claim 1 wherein said part holding assembly has a rotational platter with a platter axis of rotation that is substantially perpendicular to said shoulder centerline such that said part is attached to said platter and further comprising:
performing said method to compensate for said combined load offset on a part positioner system to locate a first balanced location on said column for said counter weight pack;
recording said first balanced location on said column for said counter weight pack;
rotating said platter such that said part is rotated at least partially around said platter axis of rotation;
performing said method to compensate for said combined load offset on a part positioner system to locate an additional balanced location on said column for said counter weight pack;
recording said additional balanced location counter weight pack on said column for said counter weight pack;
performing said rotating of said platter, said performing of said method to compensate for said combined load offset to locate said additional balanced location, and said recording said additional balanced location at least one time such that at least one supplementary balanced location on said column for said counter weight pack is recorded;

averaging said first balanced location with said at least one supplementary balanced location to determine an average balanced location; and, operating said part positioner system with said counter weight pack at said average balanced location on said column to position said part to accommodate work operations of said robot.

14. A method to compensate for a combined load offset on a part positioner system that positions a part to be worked on by a robot comprising:

loading said part onto a part holding assembly of said part positioner system to create a combined load, said part positioner system having a rotational drive that rotates said combined load around a rotational drive axis of rotation and at least one column having at least one counter weight pack that extends substantially perpendicular to said rotational drive axis of rotation;

holding said combined load using said rotational shoulder drive at an angular position such that said angular position of said combined load provides a substantive weight for said shoulder drive to resist when holding said combined load at said angular position;

moving said at least one counter weight pack linearly along a length of said at least one column in a predetermined direction at a predetermined speed;

measuring a torque applied to said shoulder drive as a function of power delivered to said shoulder drive while moving said at least one counter weight pack;

reversing direction of said movement of said at least one counter weight pack if said measured torque is increasing;

stopping said movement of said at least one counter weight pack at a balanced location on said column when said torque reaches a minimum torque value; and, operating said part positioner system with a balanced combined total load to position said part to accommodate work operations of said robot.

15. The method of claim 14 wherein said minimum torque value is at least one of the group comprising: a substantially zero value, a value detected at an inflection point when said measured torque is detected to switch rotational directions, and a value measured when said counter weight pack reaches an end of said length of said column.

16. The method of claim 14 further comprising:

reversing direction and slowing movement speed of said movement of said at least one counter weight pack if a switch in rotational direction of said measured torque is detected; and, repeating said reversing direction and slowing movement speed of said movement of said at least one counter weight pack if a switch in rotational direction of said measured torque is detected until a desired accuracy of said minimum torque value is achieved.

17. The method of claim 14 wherein said part positioner system is one of a type of the group comprising: a Drop Center H part positioner, a SkyHook part positioner, and a SkyHook with platter tail stock part positioner.

18. The method of claim 14 wherein said measuring said torque on said rotational drive measures a value proportional to torque.

19. The method of claim 18 wherein said value proportional to torque is at least one of the group comprising: actual torque applied by said rotational shoulder drive, current drawn by said rotational shoulder and power supplied to said rotational shoulder drive.

20. The method of claim 14 wherein said part holding assembly has a rotational platter with a platter axis of rotation that is substantially perpendicular to said rotational drive axis of rotation such that said part is attached to said platter and further comprising:

performing said method to compensate for said combined load offset on a part positioner system to locate a first balanced location on said at least one column for said at least one counter weight pack;

rotating said platter such that said part is rotated at least partially around said platter axis of rotation;

performing said method to compensate for said combined load offset on a part positioner system to locate a second balanced location on said at least one column for said at least one counter weight pack; and, operating said part positioner system with said at least one counter weight pack at said second balanced location on said at least one column to position said part to accommodate work operations of said robot.

21. The method of claim 14 wherein said part holding assembly has a rotational platter with a platter axis of rotation that is substantially perpendicular to said rotational drive axis of rotation such that said part is attached to said platter and further comprising:

performing said method to compensate for said combined load offset on a part positioner system to locate a first balanced location on said at least one column for said at least one counter weight pack;

recording said first balanced location on said at least one column for said at least one counter weight pack;

rotating said platter such that said part is rotated at least partially around said platter axis of rotation;

performing said method to compensate for said combined load offset on a part positioner system to locate an additional balanced location on said at least one column for said at least one counter weight pack;

recording said additional balanced location counter weight pack on said at least one column for said at least one counter weight pack;

performing said rotating of said platter, said performing of said method to compensate for said combined load offset to locate said additional balanced location, and said recording said additional balanced location at least one time such that at least one supplementary balanced location on said at least one column for said at least one counter weight pack is recorded;

averaging said first balanced location with said at least one supplementary balanced location to determine an average balanced location; and, operating said part positioner system with said at least one counter weight pack at said average balanced location on said at least one column to position said part to accommodate work operations of said robot.

22. A method to compensate for a combined load offset on a part positioner system that positions a part to be worked on by a robot comprising:

providing said part positioner system that has a shoulder with a rotational shoulder drive that rotates a part holding assembly around a shoulder center line, said shoulder center line being a line along an axis of rotation of said rotational shoulder drive, said part holding assembly comprising a column disposed perpendicular to said shoulder center line;

providing a counter weight system for said column that has a counter weight pack that is moveable back and forth along at least a portion of said column length of said column by a linear actuator;

loading said part to be worked on by said robot onto said part holding assembly to create a combined load of said part holding assembly and said part;

determining a counter weight balance movement direction that indicates a direction to move said counter weight pack along said portion of said column length to reduce a torque applied by said rotational shoulder drive to rotate said combined load;

measuring a base torque on said rotational shoulder drive by performing a torque measurement sub-process, said torque measurement sub-process further comprising:
  driving said combined load using said rotational shoulder drive; and,
  measuring a torque on said shoulder drive as a function of angular position of said rotational shoulder drive and power supplied to said rotational shoulder drive;

performing a counter weight adjustment sub-process, said counter weight adjustment sub-process further comprising:
  moving said counter weight pack by said linear actuator said predetermined distance in said counter weight balance movement direction along said portion of said column length;
  measuring a test torque on said rotational shoulder drive by performing said torque measurement sub-process;
  comparing said base torque to said test torque; and,
  setting said base torque equal to said test torque and repeating said counter weight adjustment sub-process if said test torque is less than said base torque; and, operating said part positioner system with a balanced combined total load to position said part to accommodate work operations of said robot.

23. The method of claim 22:
wherein said driving of said combined load using said rotational shoulder drive of said torque measurement sub-process further comprises rotating said combined load over a change in angular position of said shoulder drive in a period of time; and,
wherein said measuring of torque on said rotational shoulder drive during said driving of said combined load of said torque measurement sub-process determines torque as a function of power supplied to said rotational drive to rotate said combined load and a rotational speed that is a function of said change in angular position of said rotational shoulder drive in said period of time.

24. The method of claim 22:
wherein said driving of said combined load using said rotational shoulder drive of said torque measurement sub-process further comprises driving said combined load at an angular position such that said rotational shoulder drive holds said combined load at said angular position and such that said angular position of said combined load provides a substantive weight for said shoulder drive to resist when holding said combined load at said angular position; and,
wherein said measuring of torque on said rotational shoulder drive during said driving of said combined load of said torque measurement sub-process determines torque as a function of power supplied to said rotational drive to hold said combined load at said angular position, said angular position of said combined load, and a weight of said combined load.

25. The method of claim 22 wherein said process of determining said counter weight balance movement direction further comprises:
  measuring a reference torque on said rotational shoulder drive by performing said torque measurement sub-process;
  moving said counter weight pack by said linear actuator a predetermined distance in an arbitrary direction along said portion of said column length prior to said process of measuring a base torque;
  comparing said reference torque to said base torque; and
  setting said counter weight balance movement direction equal to said arbitrary direction if said reference torque is less than said base torque, otherwise setting said counter weight balance movement direction said portion of said column length to a direction opposite said arbitrary direction prior to said process of performing said counter weight adjustment sub-process.

26. The method of claim 22 wherein said process of determining said counter weight balance movement direction further comprises:
  moving said counter weight pack to either end of said column; and
  setting said counter weight balance movement direction in the direction moving said counter weight pack to an opposite end of said column from said end where said counter weight pack is located.

27. The method of claim 22 further comprising:
  reducing said predetermined distance;
  toggling said counter weight balance movement direction to an opposite direction;
  setting said base torque equal to said test torque; and
  repeating said counter weight adjustment sub-process.

28. The method of claim 22 wherein said measuring of torque on said rotational shoulder drive measures a value proportional to torque.

29. The method of claim 28 wherein said value proportional to torque is at least one of the group comprising: actual torque applied by said rotational shoulder drive, current drawn by said rotational shoulder and power supplied to said rotational shoulder drive.

30. The method of claim 22 wherein said part holding assembly has a rotational platter with a platter axis of rotation that is substantially perpendicular to said shoulder centerline such that said part is attached to said platter and further comprising:
  performing said method to compensate for said combined load offset on a part positioner system to locate a first balanced location on said column for said counter weight pack;
  rotating said platter such that said part is rotated at least partially around said platter axis of rotation;
  performing said method to compensate for said combined load offset on a part positioner system to locate a second balanced location on said column for said counter weight pack; and,
  operating said part positioner system with said counter weight pack at said second balanced location on said column to position said part to accommodate work operations of said robot.

31. The method of claim 22 wherein said part holding assembly has a rotational platter with a platter axis of rotation that is substantially perpendicular to said shoulder centerline such that said part is attached to said platter and further comprising:

performing said method to compensate for said combined load offset on a part positioner system to locate a first balanced location on said column for said counter weight pack;

recording said first balanced location on said column for said counter weight pack;

rotating said platter such that said part is rotated at least partially around said platter axis of rotation;

performing said method to compensate for said combined load offset on a part positioner system to locate an additional balanced location on said column for said counter weight pack;

recording said additional balanced location counter weight pack on said column for said counter weight pack;

performing said rotating of said platter, said performing of said method to compensate for said combined load offset to locate said additional balanced location, and said recording said additional balanced location at least one time such that at least one supplementary balanced location on said column for said counter weight pack is recorded;

averaging said first balanced location with said at least one supplementary balanced location to determine an average balanced location; and, operating said part positioner system with said counter weight pack at said average balanced location on said column to position said part to accommodate work operations of said robot.

32. A load compensation system that compensates for a combined load offset on a part positioner system that positions a part to be worked on by a robot comprising:

said part positioner system having a shoulder with a rotational shoulder drive that rotates a part holding assembly around a shoulder center line, said shoulder center line being a line along an axis of rotation of said rotational shoulder drive, said part holding assembly comprising a column having a column length disposed perpendicular to said shoulder center line;

a counter weight system for said column that has a counter weight pack that is moveable back and forth along at least a portion of said column length of said column by a linear actuator;

said part to be worked on by said robot being loaded onto said part positioner by being attached to said part holding assembly to create a combined load of said part holding assembly and said part; and, a torque measurement subsystem that drives said combined load using said rotational shoulder drive and measures torque on said rotational shoulder drive during said driving of said combined load as a function of angular position of said rotational shoulder drive and power supplied to said rotational shoulder drive;

a counter weight adjustment subsystem that measures a test torque on said rotational shoulder drive using said torque measurement subsystem calculates an updated position for said counter weight pack that substantially balances said combined load with respect to said shoulder center line as a function of said test torque, and adjusts said counter weight pack by said linear actuator along said portion of said column length to said updated position.

33. The load compensation system of claim 32:

wherein said driving of said combined load using said rotational shoulder drive further comprises rotating said combined load over a change in angular position of said shoulder drive in a period of time; and, wherein said measuring of torque on said rotational shoulder drive during said driving of said combined load determines torque as a function of power supplied to said rotational drive to rotate said combined load and a rotational speed that is a function of said change in angular position of said rotational shoulder drive in said period of time.

34. The load compensation system of claim 32:

wherein said driving of said combined load using said rotational shoulder drive further comprises driving said combined load at an angular position such that said rotational shoulder drive holds said combined load at said angular position and such that said angular position of said combined load provides a substantive weight for said shoulder drive to resist when holding said combined load at said angular position; and, wherein said measuring of torque on said rotational shoulder drive during said driving of said combined load determines torque as a function of power supplied to said rotational drive to hold said combined load at said angular position, said angular position of said combined load, and a weight of said combined load.

35. The load compensation system of claim 32 wherein said part positioner system further comprises:

a part holding beam disposed parallel to said shoulder center line, said part holding beam being attached to said shoulder drive by said column;

a tail stock section for shoulder drive connected to said part holding beam by a second column disposed perpendicularly between said shoulder center line and said part holding beam, said tail stock section being attached to said second column with a rotational joint centered on said shoulder center line; and, a second counter weight system for said second column that operates in concert with said counter weight system for said column attached to said shoulder drive.

36. The load compensation system of claim 32 further comprising a runtime adjustment subsystem that adjusts said counter weight pack to balance said combined load while operating said part positioner system to position said part to accommodate work operations of said robot.

37. The load compensation system of claim 32 wherein said linear actuator is manually operated and movement commands for said linear actuator are communicated to an operator that manually operates said linear actuator.

38. The load compensation system of claim 32 wherein said linear actuator is motor operated and movement commands are sent to said motor operated linear actuator to automatically adjust said counter weight pack.

39. The load compensation system of claim 32 wherein said part positioner system is one of a type of the group comprising: a Drop Center H part positioner, a SkyHook part positioner, and a SkyHook with platter tail stock part positioner.

40. The load compensation system of claim 32 wherein said counter weight system further comprises guide rails to support and guide said counter weight pack as said counter weight pack is moved along said portion of said column length.

41. The load compensation system of claim 32 wherein said measuring of torque on said rotational shoulder drive measures a value proportional to torque.

42. The load compensation system of claim 41 wherein said value proportional to torque is at least one of the group comprising: actual torque applied by said rotational shoulder drive, current drawn by said rotational shoulder and power supplied to said rotational shoulder drive.

43. The load compensation system of claim 32 wherein said part holding assembly has a rotational platter with a platter axis of rotation that is substantially perpendicular to said shoulder centerline such that said part is attached to said platter and further comprising:
- a platter position adjustment subsystem that compensates for said combined load offset on a part positioner system to locate a first balanced location on said column for said counter weight pack, rotates said platter such that said part is rotated at least partially around said platter axis of rotation, and compensates for said combined load offset on a part positioner system to locate a second balanced location on said column for said counter weight pack.

44. The load compensation system of claim 32 wherein said part holding assembly has a rotational platter with a platter axis of rotation that is substantially perpendicular to said shoulder centerline such that said part is attached to said platter and further comprising:
- a platter position adjustment subsystem that compensates for said combined load offset on a part positioner system to locate a first balanced location on said column for said counter weight pack, records said first balanced location on said column for said counter weight pack, rotates said platter such that said part is at least partially rotated around said platter axis of rotation, compensates for said combined load offset on a part positioner system to locate an additional balanced location on said column for said counter weight pack, records said additional balanced location counter weight pack on said column for said counter weight pack, performs finding said additional balanced location at least one time such that at least one supplementary balanced location on said column for said counter weight pack is recorded, averages said first balanced location with said at least one supplementary balanced location to determine an average balanced location, and moves said counter weight pack to said average balanced location.

45. A load compensation system that compensates for a combined load offset on a part positioner system that positions a part to be worked on by a robot comprising:
- said part positioner system having a part holding assembly with said part loaded on said part holding assembly to create a combined load, said part positioner system having a rotational drive that rotates said combined load around a rotational drive axis of rotation and at least one column having at least one counter weight pack that extends substantially perpendicular to said rotational drive axis of rotation; and,
- a load balancing subsystem that holds said combined load using said rotational shoulder drive at an angular position such that said angular position of said combined load provides a substantive weight for said shoulder drive to resist when holding said combined load at said angular position, moves said at least one counter weight pack linearly along a length of said at least one column in a predetermined direction at a predetermined speed, measures a torque applied to said shoulder drive as a function of power delivered to said shoulder drive while moving said at least one counter weight pack, reverses direction of said movement of said at least one counter weight pack if said measured torque is increasing, and stops said movement of said at least one counter weight pack at a balanced location on said column when said torque reaches a minimum torque value.

46. The load compensation system of claim 45 wherein said minimum torque value is at least one of the group comprising: a substantially zero value, a value detected at an inflection point when said measured torque is detected to switch rotational directions, and a value measured when said counter weight pack reaches an end of said length of said column.

47. The load compensation system of claim 45 wherein said load balancing subsystem further reverses direction and slows movement speed of said movement of said at least one counter weight pack if a switch in rotational direction of said measured torque is detected; and, repeats said reversing direction and slowing movement speed of said movement of said at least one counter weight pack if a switch in rotational direction of said measured torque is detected until a desired accuracy of said minimum torque value is achieved.

48. The load compensation system of claim 45 wherein said part positioner system is one of a type of the group comprising: a Drop Center H part positioner, a SkyHook part positioner, and a SkyHook with platter tail stock part positioner.

49. The load compensation system of claim 45 wherein said measuring said torque on said rotational drive measures a value proportional to torque.

50. The load compensation system of claim 49 wherein said value proportional to torque is at least one of the group comprising: actual torque applied by said rotational shoulder drive, current drawn by said rotational shoulder and power supplied to said rotational shoulder drive.

51. The load compensation system of claim 45 wherein said part holding assembly has a rotational platter with a platter axis of rotation that is substantially perpendicular to said rotational drive axis of rotation such that said part is attached to said platter and further comprising:
- a platter position adjustment subsystem that compensates for said combined load offset on a part positioner system to locate a first balanced location on said at least one column for said at least one counter weight pack, rotates said platter such that said part is rotated at least partially around said platter axis of rotation, compensates for said combined load offset on a part positioner system to locate a second balanced location on said at least one column for said at least one counter weight pack.

52. The load compensation system of claim 45 wherein said part holding assembly has a rotational platter with a platter axis of rotation that is substantially perpendicular to said rotational drive axis of rotation such that said part is attached to said platter and further comprising:
- a platter position adjustment subsystem that compensates for said combined load offset on a part positioner system to locate a first balanced location on said at least one column for said at least one counter weight pack, records said first balanced location on said at least one column for said at least one counter weight pack, rotates said platter such that said part is rotated at least partially around said platter axis of rotation, compensates for said combined load offset on a part positioner system to locate an additional balanced location on said at least one column for said at least one counter weight pack, records said additional balanced location counter weight pack on said at least one column for said at least one counter weight pack, performs finding said additional balanced location at least one time such that at least one supplementary balanced location on said at least one column for said at least one counter weight pack is recorded, averages said first balanced location with said at least one supplementary balanced location to determine an average balanced location; and moves said at least one counter weight pack to said average balanced location.

53. A load compensation system that compensates for a combined load offset on a part positioner system that positions a part to be worked on by a robot comprising:
- said part positioner system having a shoulder with a rotational shoulder drive that rotates a part holding assembly around a shoulder center line, said shoulder center line being a line along an axis of rotation of said rotational shoulder drive, said part holding assembly comprising a column having a column length disposed perpendicular to said shoulder center line;
- a counter weight system for said column that has a counter weight pack that is moveable back and forth along at least a portion of said column length of said column by a linear actuator;
- said part to be worked on by said robot being loaded onto said part positioner by being attached to said part holding assembly to create a combined load of said part holding assembly and said part; and,
- a movement direction determination subsystem that determines a counter weight balance movement direction that indicates a direction to move said counter weight pack along said portion of said column length to reduce a torque applied by said rotational shoulder drive to rotate said combined load;
- a torque measurement subsystem that drives said combined load using said rotational shoulder drive and measures torque on said rotational shoulder drive during said driving of said combined load as a function of angular position of said rotational shoulder drive and power supplied to said rotational shoulder drive;
- a base torque measurement subsystem that measures a base torque using said torque measurement subsystem; and,
- a counter weight adjustment subsystem that performs a counter weight adjustment process that moves said counter weight pack by said linear actuator said predetermined distance in said counter weight balance movement direction along said portion of said column length, measures said test torque on said rotational shoulder drive using said torque measurement subsystem; compares said base torque to said test torque, and, sets said base torque equal to said test torque and repeats said counter weight adjustment process if said test torque is less than said base torque.

54. The load compensation system of claim 53:
- wherein said driving of said combined load using said rotational shoulder drive of said torque measurement sub-process further comprises rotating said combined load over a change in angular position of said shoulder drive in a period of time; and,
- wherein said measuring of torque on said rotational shoulder drive during said driving of said combined load of said torque measurement sub-process determines torque as a function of power supplied to said rotational drive to rotate said combined load and a rotational speed that is a function of said change in angular position of said rotational shoulder drive in said period of time.

55. The load compensation system of claim 53:
- wherein said driving of said combined load using said rotational shoulder drive of said torque measurement sub-process further comprises driving said combined load at an angular position such that said rotational shoulder drive holds said combined load at said angular position and such that said angular position of said combined load provides a substantive weight for said shoulder drive to resist when holding said combined load at said angular position; and,
- wherein said measuring of torque on said rotational shoulder drive during said driving of said combined load of said torque measurement sub-process determines torque as a function of power supplied to said rotational drive to hold said combined load at said angular position, said angular position of said combined load, and a weight of said combined load.

56. The load compensation system of claim 53 wherein said movement direction determination subsystem further:
- measures a reference torque on said rotational shoulder drive by performing said torque measurement sub-process;
- moves said counter weight pack by said linear actuator a predetermined distance in an arbitrary direction along said portion of said column length prior to said process of measuring a base torque;
- compares said reference torque to said base torque; and
- sets said counter weight balance movement direction equal to said arbitrary direction if said reference torque is less than said base torque, otherwise setting said counter weight balance movement direction said portion of said column length to a direction opposite said arbitrary direction prior to said process of performing said counter weight adjustment sub-process.

57. The load compensation system of claim 53 wherein said said movement direction determination subsystem further:
- moves said counter weight pack to either end of said column; and
- sets said counter weight balance movement direction in the direction moving said counter weight pack to an opposite end of said column from said end where said counter weight pack is located.

58. The load compensation system of claim 53 further comprising an accuracy subsystem that reduces said predetermined distance, toggles said counter weight balance movement direction to an opposite direction, sets said base torque equal to said test torque, and repeat said counter weight adjustment until a desired accuracy is achieved.

59. The load compensation system of claim 53 wherein said measuring of torque on said rotational shoulder drive measures a value proportional to torque.

60. The load compensation system of claim 59 wherein said value proportional to torque is at least one of the group comprising: actual torque applied by said rotational shoulder drive, current drawn by said rotational shoulder and power supplied to said rotational shoulder drive.

61. The load compensation system of claim 53 wherein said part holding assembly has a rotational platter with a platter axis of rotation that is substantially perpendicular to said shoulder centerline such that said part is attached to said platter and further comprising:
- a platter position adjustment subsystem that compensates for said combined load offset on a part positioner system to locate a first balanced location on said column for said counter weight pack, rotates said platter such that said part is rotated at least partially around said platter axis of rotation, and compensates for said combined load offset on a part positioner system to locate a second balanced location on said column for said counter weight pack.

62. The load compensation system of claim 53 wherein said part holding assembly has a rotational platter with a platter axis of rotation that is substantially perpendicular to said shoulder centerline such that said part is attached to said platter and further comprising:
- a platter position adjustment subsystem that compensates for said combined load offset on a part positioner system to locate a first balanced location on said column for said counter weight pack, records said first balanced location on said column for said counter weight pack, rotates said platter such that said part is at least partially rotated around said platter axis of rotation, compensates for said combined load offset on a part positioner system to locate an additional balanced location on said column for said counter weight pack, records said additional balanced location counter weight pack on said column for said counter weight pack, performs finding said additional balanced location at least one time such that at least one supplementary balanced location on said column for said counter weight pack is recorded, averages said first balanced location with said at least one supplementary balanced location to determine an average balanced location, and moves said counter weight pack to said average balanced location.

63. A load compensation system that compensates for a combined load offset on a part positioner system that positions a part to be worked on by a robot comprising:
   means for providing said part positioner system that has a shoulder with a rotational shoulder drive that rotates a part holding assembly around a shoulder center line, said shoulder center line being a line along an axis of rotation of said rotational shoulder drive, said part holding assembly comprising a column having a column length disposed perpendicular to said shoulder center line;
   means for providing a counter weight system for said column that has a counter weight pack that is moveable back and forth along at least a portion of said column length of said column by a linear actuator;
   means for loading said part to be worked on by said robot onto said part positioner to create a combined load of said part holding assembly and said part;
   means for driving said combined load using said rotational shoulder drive;
   means for measuring a test torque on said rotational shoulder drive during said driving of said combined load;
   means for calculating an updated position for said counter weight pack that substantially balances said combined load with respect to said shoulder center line as a function of said test torque;
   means for adjusting said counter weight pack by said linear actuator along said portion of said column length to said updated position; and,
   means for operating said part positioner system with a balanced combined total load to position said part to accommodate work operations of said robot.

64. A load compensation system that compensates for a combined load offset on a part positioner system that positions a part to be worked on by a robot comprising:
   means for loading said part onto a part holding assembly of said part positioner system to create a combined load, said part positioner system having a rotational drive that rotates said combined load around a rotational drive axis of rotation and at least one column having at least one counter weight pack that extends substantially perpendicular to said rotational drive axis of rotation;
   means for holding said combined load using said rotational shoulder drive at an angular position such that said angular position of said combined load provides a substantive weight for said shoulder drive to resist when holding said combined load at said angular position;
   means for moving said at least one counter weight pack linearly along a length of said at least one column in a predetermined direction at a predetermined speed;
   means for measuring a torque applied to said shoulder drive as a function of power delivered to said shoulder drive while moving said at least one counter weight pack;
   means for reversing direction of said movement of said at least one counter weight pack if said measured torque is increasing;
   means for stopping said movement of said at least one counter weight pack at a balanced location on said column when said torque reaches a minimum torque value; and,
   means for operating said part positioner system with a balanced combined total load to position said part to accommodate work operations of said robot.

65. A load compensation system that compensates for a combined load offset on a part positioner system that positions a part to be worked on by a robot comprising:
   means for providing said part positioner system that has a shoulder with a rotational shoulder drive that rotates a part holding assembly around a shoulder center line, said shoulder center line being a line along an axis of rotation of said rotational shoulder drive, said part holding assembly comprising a column disposed perpendicular to said shoulder center line;
   means for providing a counter weight system for said column that has a counter weight pack that is moveable back and forth along at least a portion of said column length of said column by a linear actuator;
   means for loading said part to be worked on by said robot onto said part positioner to create a combined load of said part holding assembly and said part;
   means for determining a counter weight balance movement direction that indicates a direction to move said counter weight pack along said portion of said column length to reduce a torque applied by said rotational shoulder drive to rotate said combined load;
   means for measuring a base torque on said rotational shoulder drive by performing a torque measurement sub-process, said torque measurement sub-process further comprising:
      means for driving said combined load using said rotational shoulder drive; and,
      means for measuring a torque on said shoulder drive;
   means for performing a counter weight adjustment sub-process, said counter weight adjustment sub-process further comprising:
      means for moving said counter weight pack by said linear actuator said predetermined distance in said counter weight balance movement direction along said portion of said column length;
      means for measuring a test torque on said rotational shoulder drive by performing said torque measurement sub-process;
      means for comparing said base torque to said test torque; and,
      means for setting said base torque equal to said test torque and repeating said counter weight adjustment sub-process if said test torque is less than said base torque; and,
   means for operating said part positioner system with a balanced combined total load to position said part to accommodate work operations of said robot.

* * * * *